United States Patent [19]

King, Jr.

[11] 4,053,970

[45] Oct. 18, 1977

[54] PRELOAD ADAPTER

[76] Inventor: John O. King, Jr., 3990 N. Ivy Road, Atlanta, Ga. 30342

[21] Appl. No.: 673,422

[22] Filed: Apr. 5, 1976

Related U.S. Application Data

[62] Division of Ser. No. 542,077, Jan. 17, 1975, abandoned.

[51] Int. Cl.² .......................................... B23P 19/04
[52] U.S. Cl. ..................................... 29/240; 81/57.38
[58] Field of Search ................. 29/240, 258, 264, 259, 29/262; 81/57.38, 56

[56] References Cited

U.S. PATENT DOCUMENTS

| 62,404 | 2/1867 | Gile et al. | 29/262 |
| 1,443,052 | 1/1923 | Stephens | 29/258 |
| 2,866,370 | 12/1958 | Biach | 81/57.38 |
| 3,749,362 | 7/1973 | O'Connor et al. | 81/57.38 |

Primary Examiner—James L. Jones, Jr.
Attorney, Agent, or Firm—B. J. Powell

[57] ABSTRACT

A preload adapter for use with a lockbit installation gun having a nose assembly to install a fastener having a threaded engagement section to be engaged by an internally threaded nut and a pulling section projecting beyond the threaded engagement section in a hole through a work piece so that the lockbolt installation gun can exert an axial preload on the fastener while the nut is tightened onto the threaded engagement section.

3 Claims, 41 Drawing Figures

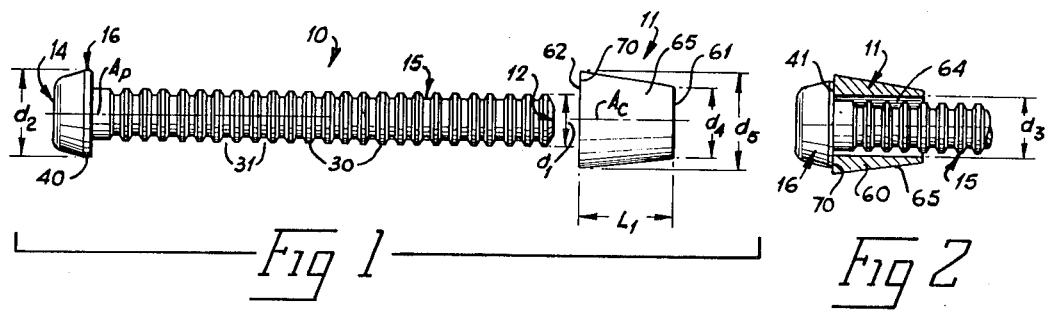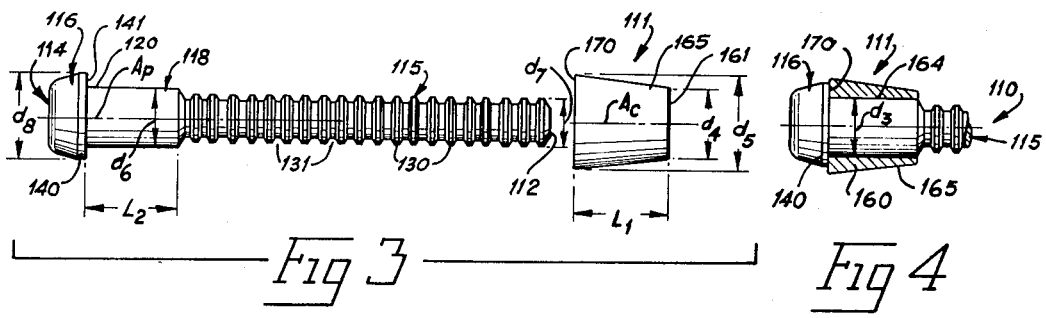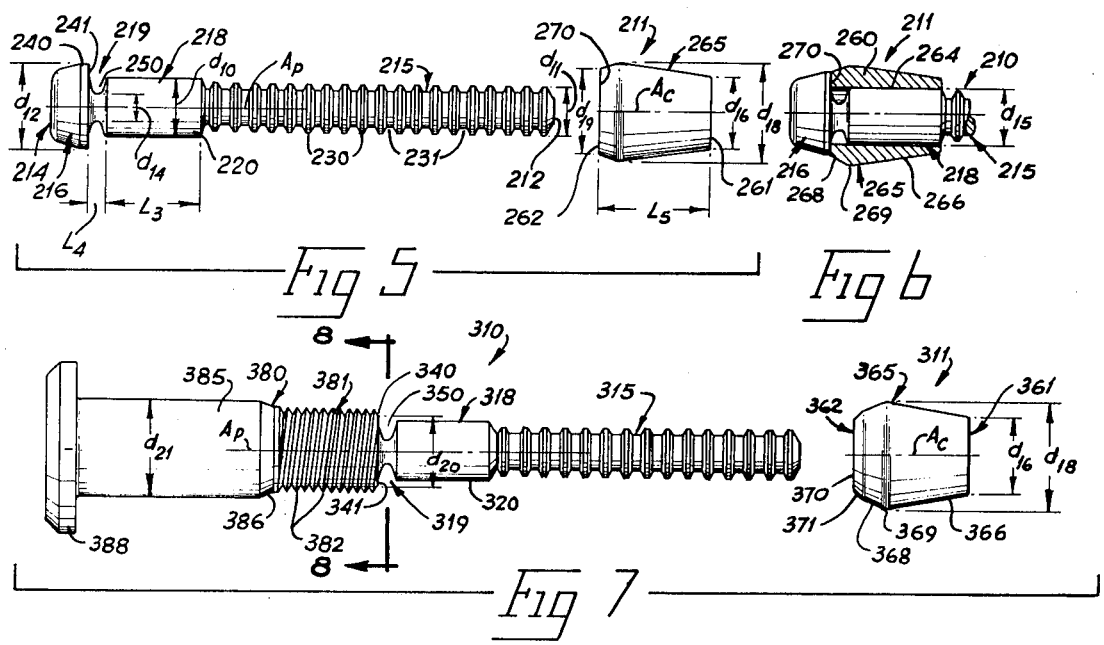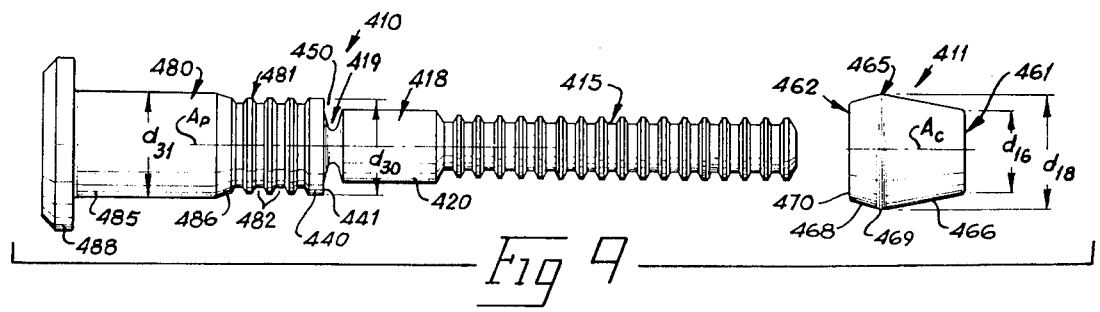

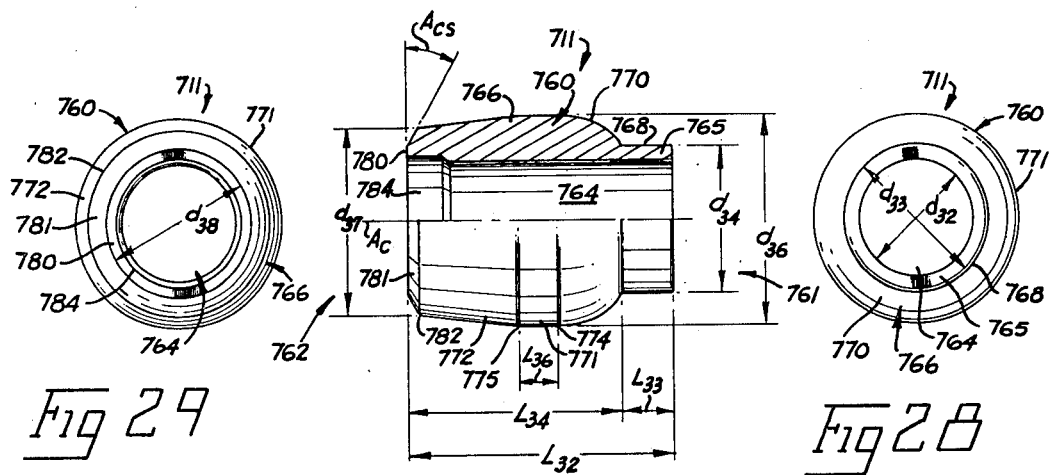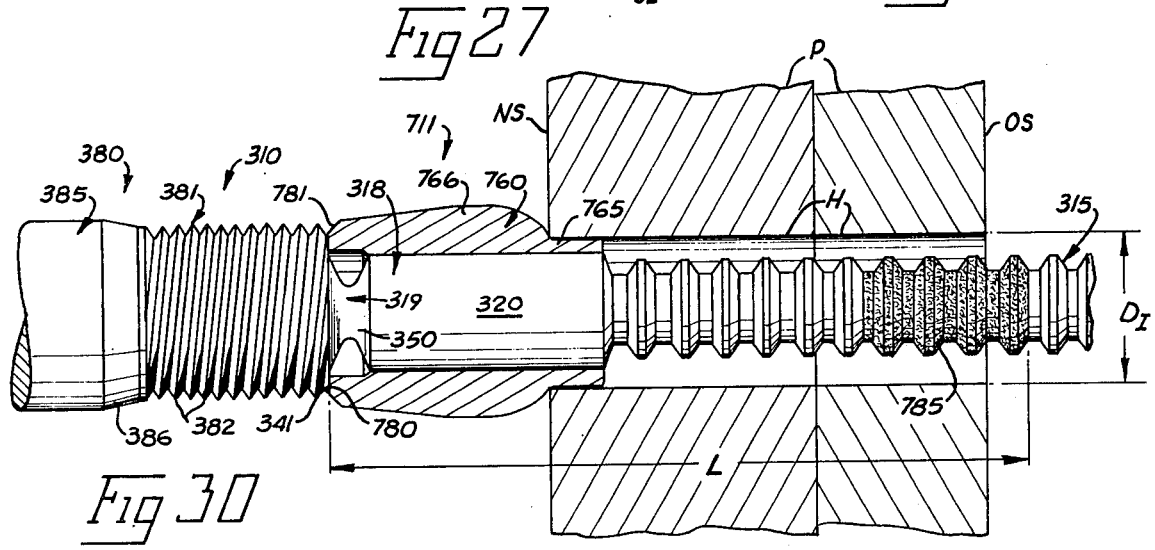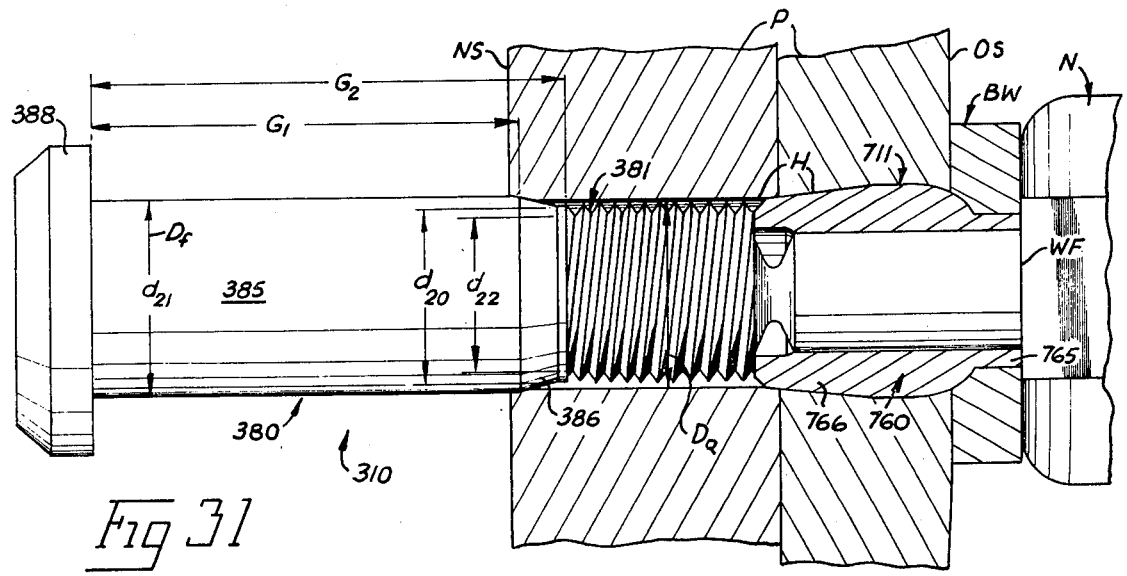

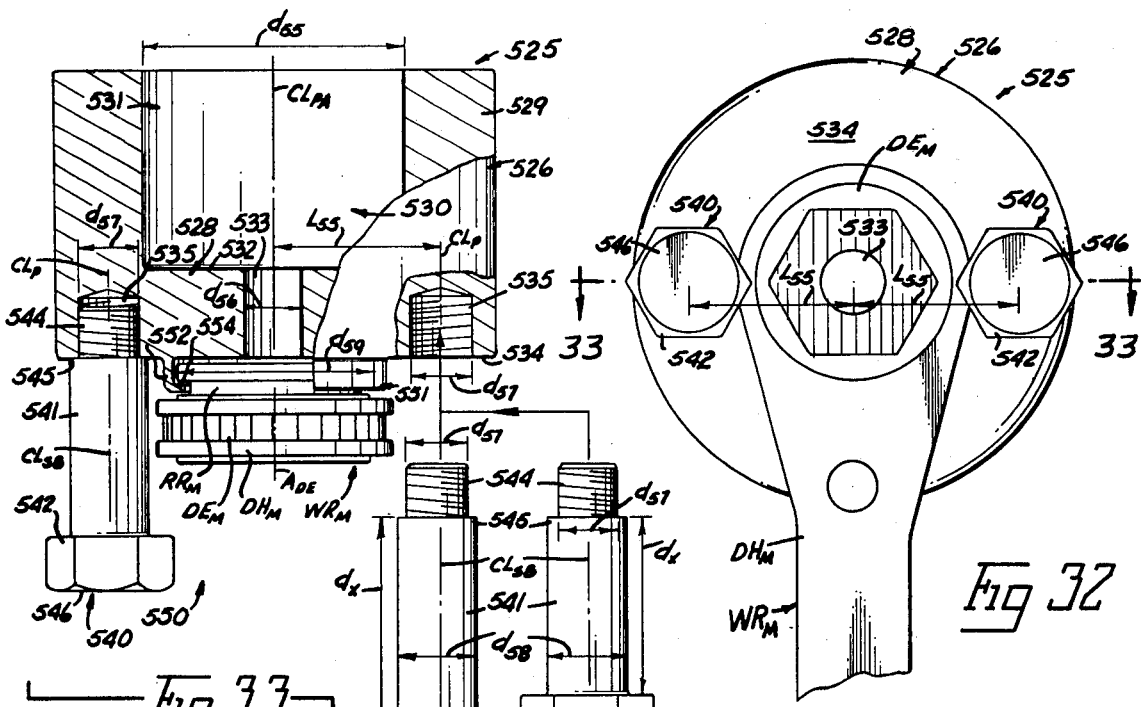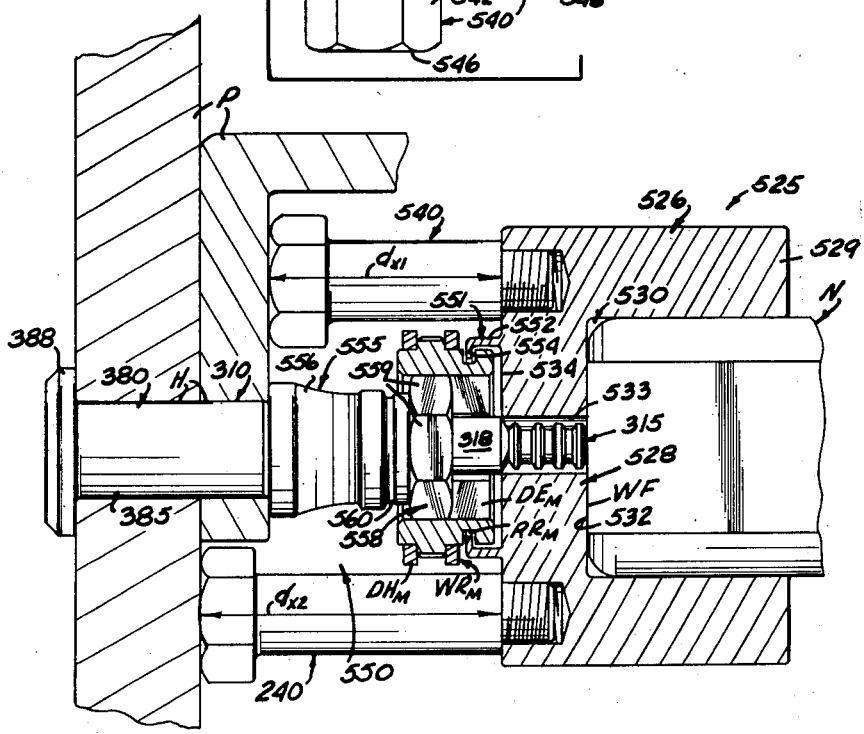

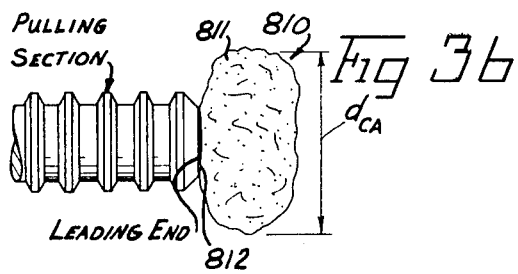
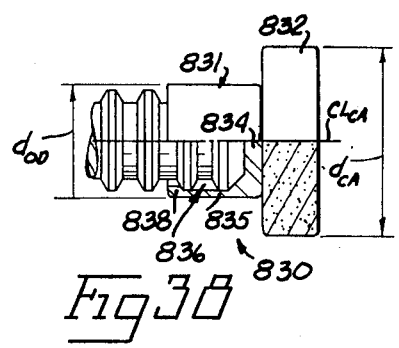
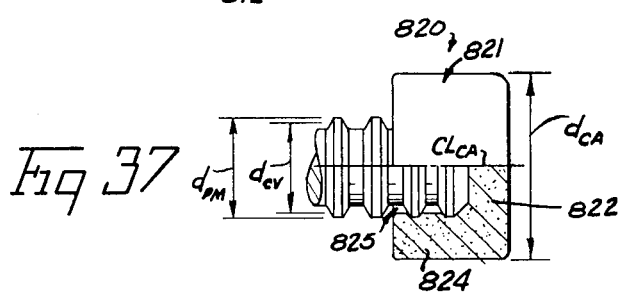
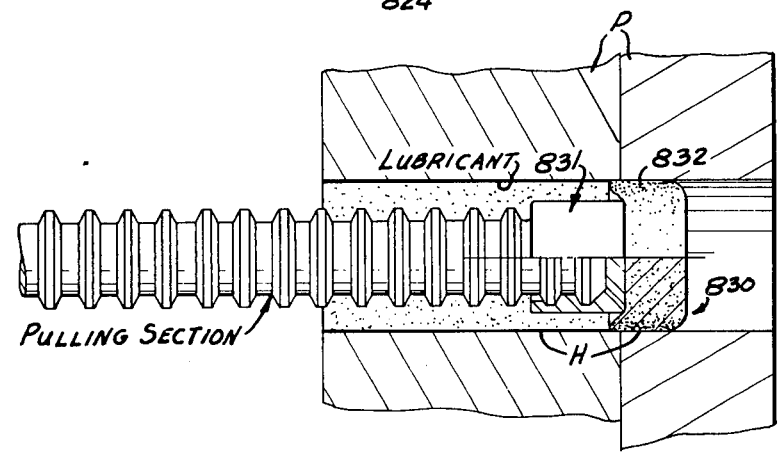
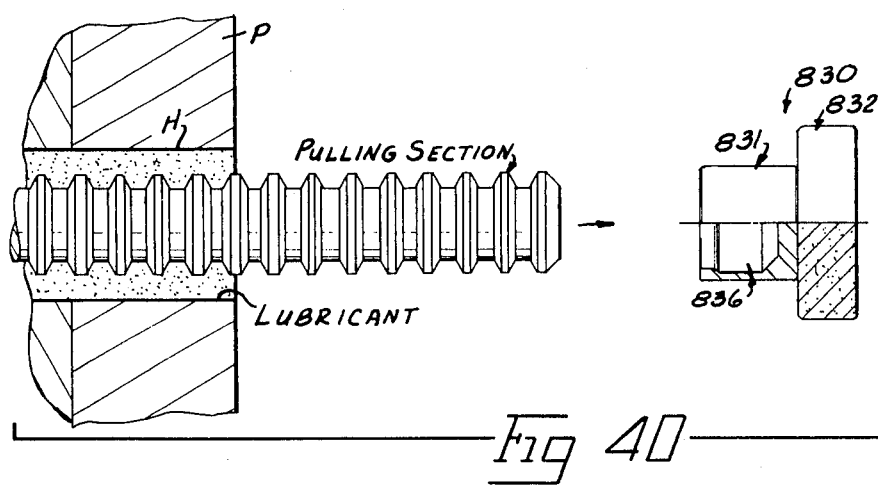

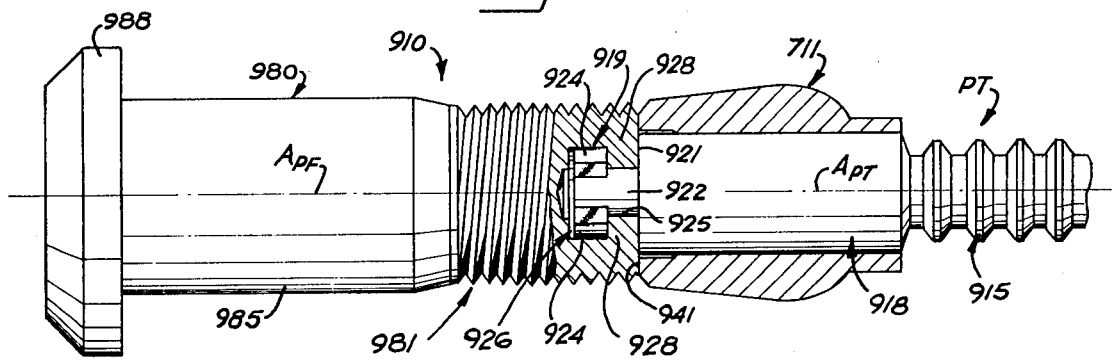

PRELOAD ADAPTER

CROSS-REFERENCE TO RELATED APPLICATIONS

This application is a division of my co-pending application Ser. No. 542,077, filed Jan. 17, 1975, now abandoned.

BACKGROUND OF THE INVENTION

As fastener joints in work pieces have become more highly stressed, especially in the aerospace industry, a great deal of effort has been expended in an attempt to increase the fatigue life of the fastener joints. One of the most successful techniques that has been used is commonly referred to as coldworking in which the holes through the work pieces are expanded beyond the elastic limit of the material of the work pieces prior to the installation of the fastener through the holes. This causes a compressive stress gradient to be induced in the work pieces immediately adjacent the holes that serves to increase the fatigue life of the resulting joint. Several techniques have been conceived which coldwork the holes such as those disclosed by U.S. Pat. Nos. 3,270,410; 3,434,327; 3,566,662; 3,805,578; and 3,835,688. All of these techniques use a single piece mandrel which is pulled or pushed through the holes either with or without a sleeve member.

Because these mandrels have been made of one piece, however, it has been difficult to achieve the necessary hardness in the enlarged portion of the mandrel which contacts and expands the hole while at the same time being able to achieve the necessary toughness in that portion of the mandrel which is used to pull the mandrel through the hole. As a result, the prior art has had to resort to the use of exotic lubricants and to the use of sleeve members to isolate the surface of the hole from the expansion surface of the mandrel in order to be able to physically pull the mandrel through the hole and also not damage the hole.

Also the expansion surface has frequently become damaged requiring the entire mandrel to have to be resurfaced to a smaller expansion diameter or thrown away. There was also no way to insure that an oversize mandrel would not be inadvertently pulled through the holes which may render the work piece unusable.

When threaded fasteners are installed in the holes through work pieces, the torque applied to the nut as it is screwed onto the fastener to lock the fastener in place has been used to apply the desired preload to the fastener joint. Because the friction between the nut threads and the fastener threads, between the base of the nut and work piece or washer under the nut, and between the bearing surface of the fastener and hole surface cannot be accurately determined and may vary from joint to joint; the amount of preload actually applied to the fastener joint has varied widely even though the same amount of torque was used to tighten each nut.

SUMMARY OF THE INVENTION

These and other problems and disadvantages associated with the prior art are overcome by the invention disclosed herein by providing a two piece mandrel assembly with a drive pin that can be gripped to pull the mandrel assembly through the hole and a seamless expansion collet removably carried by the drive pin that expands the hole. The desired hardness can be obtained in the collet while the desired toughness can be obtained in the drive pin. This results in a minimum of lubrication being required for a coldworking operation and in the elimination of the requirement of a sleeve member to isolate the expansion surface of the mandrel from the hole surface. The invention also allows part of the mandrel assembly to be replaced without the cost of the entire mandrel. Further, the invention provides means by which an oversized expansion collet will not be inadvertently pulled through the holes to over-expand same. The drive pin can be combined with a fastener to be installed in the hole after the hole has been expanded so that the installation of the fastener is simplified. The invention also provides a technique in which a guaranteed preload can be assured in the completed fastener joint.

The apparatus of the invention includes a mandrel assembly with a drive pin having pull grooves thereon adapted to be engaged by a conventional lockbolt installation gun and a drive shoulder at one end thereof. The seamless expansion collet has an annular side wall and defines a central passage therethrough which can be slidably received over the pull grooves of the drive pin until the trailing end of the expansion collet is engaged by the drive shoulder. The outside expansion surface of the collet has a frusto-conical surface which engages the work piece about the hole to expand the hole as the drive pin is pulled through the hole by the lockbolt installation gun. The drive pin may further have a support section forward of the driving shoulder which slidably receives the expansion collet thereover in a close fit to support the expansion collet as the collet is pulled through the hole. Further, the support section on the drive pin may be connected to the driving shoulder through a breakneck groove so that if an oversized expansion collet is placed on the drive pin and attempted to be pulled through the hole, the drive pin will break at the breakneck groove to prevent the inadvertent pulling of the expansion collet through the hole to overexpand the hole. The expansion collet for use with a drive pin having a breakneck groove between the support section and the driving shoulder may have a maximum expansion section located on said expansion collet forwardly of the breakneck groove with a reduced diameter section connecting the maximum diameter to the trailing end of the collet in order to prevent the collet from being swaged into the breakneck groove of the drive pin so that it cannot be removed.

The drive pin may be made with a fastener joined to the trailing end of the pulling section and/or support section through a breakneck groove so that the fastener is installed immediately after the hole has been expanded by the expansion collet. The drive pin may be broken at the breakneck groove to separate the fastener from the pulling section after the fastener has been installed. After the hole has been expanded and the fastener positioned in the hole, the pulling section may be left attached to be used to assist in finalizing the installation of the fastener in the work piece before it is broken at the breakneck groove.

The invention also includes an adapter which can be used in conjunction with a wrenching device and a lockbolt installation gun to install the fastener with the pulling section still attached with a prescribed preload exerted on the fastener independently of the torque applied to the nut with the wrenching device. The torquing of the nut serves to lock in the preload exerted on the fastener by the lockbolt installation tool. After the nut has been tightened to lock in the preload, the pulling section is removed by breaking the drive pin at the breakneck groove.

These and other features and advantages of the invention disclosed herein will become more apparent upon consideration of the following specification and accompanying drawings wherein like characters of reference will designate corresponding parts through the several views and in which:

BRIEF DESCRIPTION OF THE DRAWINGS

FIG. 1 is an exploded elevational view showing a first embodiment of the invention;

FIG. 2 is a partial cross-sectional view of the embodiment of FIG. 1 assembled;

FIG. 3 is an exploded elevational view of a second embodiment of the invention;

FIG. 4 is a partial cross-sectional view of the embodiment of FIG. 3 assembled;

FIG. 5 is an exploded elevational view of a third embodiment of the invention;

FIG. 6 is a partial cross-sectional view of the embodiment shown in FIG. 5 assembled;

FIG. 7 is an exploded elevational view of a fourth embodiment of the invention showing a threaded fastener incorporated therein;

FIG. 9 is an exploded elevational view of a fifth embodiment of the invention with a lockbolt incorporated thereon;

FIG. 27 is a side elevational view shown partly in cross-section of a streamline collet of the invention;

FIG. 28 is a leading end view of the collet of FIG. 27;

FIG. 29 is a trailing end view of the collet of FIG. 27;

FIG. 30 is a view showing the collet of FIG. 27 ready for use;

FIG. 31 is a view similar to FIG. 30 showing the collet of FIG. 27 being used;

FIG. 32 is an operating end view of an alternate preload adapter of the invention;

FIG. 33 is an exploded cross-sectional view taken along line 33—33 in FIG. 32;

FIG. 34 is a view similar to FIG. 33 showing the alternate preload adapter in use;

FIG. 36 is a side elevational view of a cleaning applicator incorporated in the invention;

FIG. 37 is a side elevational view shown partly in section of a second embodiment of the cleaning applicator incorporated in the invention;

FIG. 38 is a side elevational view shown partly in cross-section of a third embodiment of the cleaning applicator incorporated in the invention;

FIG. 39 is a view showing the cleaning applicator of FIG. 38 being used;

FIG. 40 is a view illustrating the cleaning applicator of FIG. 38 being removed after use; and, FIG. 41 is a view illustrating a modification of the drive pin of FIG. 7;

Figure 16:
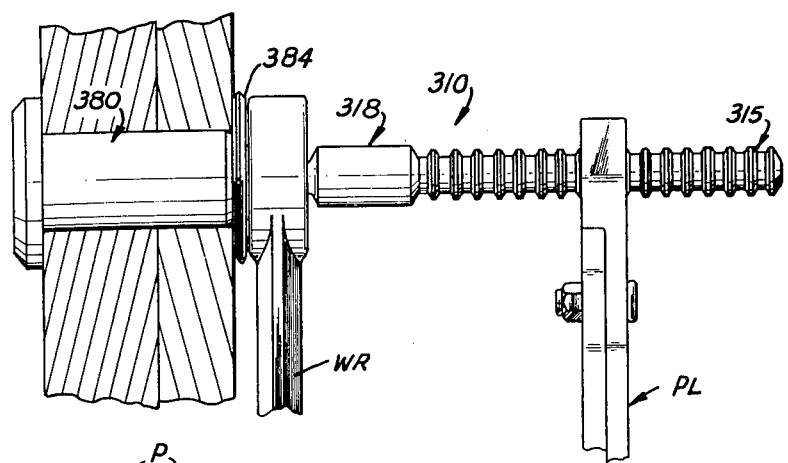
FIGS. 13–17 are enlarged views illustrating the fourth embodiment of the invention shown in FIG. 7 being installed.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIGS. 1 and 2, it will be seen that the first embodiment of the invention comprises generally a drive pin 10 and a seamless expansion collet 11 which is slidably received onto the drive pin 10. The expansion collet 11 is placed on the drive pin 10 and pulled through a hole through a work piece by pulling on the drive pin 10 to cause the expansion collet 11 to expand the hole through the work piece.

The drive pin 10 is an elongate member with a leading end 12 and a trailing end 14 and a central axis $A_p$. The drive pin 10 includes a pulling section 15 adjacent its leading end 12 and a driving section 16 adjacent its trailing end 14. The trailing end of the pulling section 15 is integral with the leading end of the driving section 16. The pulling section 15 defines a plurality of lands 30 and grooves 31 thereon along the length thereof adapted to be gripped by a conventional lockbolt installation gun with a self-releasing nose assembly to pull the drive pin 10 as will become more apparent. It will be seen that the pulling section 15 has a major diameter $d_1$ along its length.

The driving section 16 defines an annular driving shoulder 40 around the leading edge thereof concentrically about the central axis $A_p$ of the pin 10. The shoulder 40 defines an annular driving face 41 which is arranged generally concentrically about and normal to the central axis $A_p$ and projects outwardly from the pulling section 15. The driving face 41 has an outside diameter $d_2$ a prescribed amount larger than the diameter $d_1$ of the pulling section 15 as will become more apparent.

The expansion collet 11 includes a seamless annular side wall 60 concentrically arranged about a central axis $A_c$ with a length $L_1$. The collet 11 has a leading end 61 and a trailing end 62. The side wall 60 defines a cylindrical central passage 64 therethrough concentrically about the axis $A_c$ and having a diameter $d_3$ at least as great as the diameter $d_1$ so that the pulling section 15 will be slidably received through the passage 64. It will further be noted that the diameter $d_3$ is less than the diameter $d_2$ so that the driving face 41 on the driving section 16 will engage the trailing end 62 of the collet 11. The side wall 60 defines a frusto-conical outside expansion surface 65 concentrically about the central axis $A_c$ which tapers outwardly from the leading end 61 of the collet 11 toward the trailing end 62 thereof. The expansion surface 65 has a minimum diameter $d_4$ adjacent the leading end 61 of the collet 11 which is less than the diameter of the hole through the work piece prior to expansion as will become more fully understood. The expansion surface 65 further has a major diameter $d_5$ adjacent the trailing end 62 of the collet 11 which is greater than the initial diameter of the hole through the work piece prior to expansion and also greater than the outside diameter $d_2$ of the driving face 41 as will become more apparent. The diameter $d_5$ determines the amount of expansion that is to be applied to the hole through the work pieces and may be varied according to already developed data. That end of side wall 60 at the trailing end 62 of the collet 11 is provided with a rearwardly facing abuttment surface 70 which is arranged generally normal to the axis $A_c$ of the collar 11. It will be seen that the surface 70 will be engaged by the driving face 41 of the driving section 16 to force the collet 11 through the hole to expand same as will become more apparent.

SECOND EMBODIMENT

Referring to FIGS. 3 and 4, it will be seen that the second embodiment of the invention is illustrated which includes a drive pin 110 and an expansion collet 111 slidably received on the drive pin 110 to force the collet 111 through the holes in the work piece to expand the hole as the drive pin 110 is pulled through the hole with a conventional lockbolt installation gun. The drive pin 110 has a leading end 112 and a trailing end 114 with a central axis $A_p$. Drive pin 110 has a pulling section 115 and a driving section 116 which function similar to the sections 15 and 16 of the drive pin 10.

Additionally, the drive pin 110 includes a support section 118 which connects the trailing end of the pulling section 115 with the leading end of the driving section 116. The support section 118 defines a cylindrical support surface 120 thereon which has a diameter $d_6$ substantially equal to the inside diameter $d_3$ of the collet 111 as will become more apparent. It will further be noted that the support surface 120 has a length $L_2$ substantially equal to the length $L_1$ of the expansion collet 111 as will become more apparent.

The pulling section 115 is integral with the forward end of the support section 118 and is provided with alternate lands 130 and grooves 131 adapted to be gripped by a conventional lockbolt installation gun to pull the support member 110 through the holes in the work pieces. It will be noted that the pulling section 115 has a major outside diameter $d_7$ at least as small as diameter $d_6$ and which may be a prescribed amount smaller than the diameter $d_6$ of support surface 120 as will become more apparent.

Driving section 116 is similar to the driving section 16 of drive pin 10 and includes an annular shoulder 140 about the leading end thereof which defines an annular driving face 141 arranged generally normal to and concentric about the axis $A_p$. Face 141 has an outside diameter $d_8$ which corresponds to the diameter $d_2$ of the drive pin 10 to engage collet 111.

The collet 111 is similar to the collet 11 with an annular side wall 160 about a central axis $A_c$ defining a passage 164 therethrough with diameter $d_3$. The collet 111 defines a frusto-conical expansion surface 165 which tapers outwardly from the leading end 161 of the collet 111 toward the trailing end 162 thereof with minimum diameter $d_4$ and maximum diameter $d_5$. An abuttment surface 170 is defined at the trailing end of the collet 111 and is arranged generally normal to and concentric about the axis $A_c$ of the collet 111. As seen in FIG. 4, the collet 111 is slidably received onto the support section 118 so that the support surface 120 thereof is in bearing contact with the annular wall 160 of the collet 111. This insures that the collet 111 will be adequately supported as the assembly is pulled through a hole to expand same. It will further be noted that the driving face 141 engages the abuttment surface 170 to positively force the collet 111 through the hole as will become better understood.

THIRD EMBODIMENT

Referring to FIGS. 5, 6 and 10-12, it will be seen that the third embodiment of the invention is illustrated which includes a drive pin 210 and a seamless expansion collet 211 which is slidably received on the drive pin 210 to force the collet 211 through the hole in the work piece to expand the hole as the drive pin 210 is pulled through the hole with a conventional lockbolt installation gun. The drive pin 210 has a leading end 212 and a trailing end 214 with a central axis $A_p$. The drive pin 210 has a pulling section 215 and a driving section 216 which function similar to the sections 15 and 16 of the drive pin 10. The drive pin 210 also includes a support section 218 between the pulling section 215 and the driving section 216 that functions similarly to the support section 118 of pin 110. Additionally, the drive pin 210 includes a breakneck section 219 that connects the trailing end of the support section 218 with the leading end of the driving section 216.

The support section 218 is integral with the trailing end of the pulling section 215 and defines a cylindrical support surface 220 thereon concentric about axis $A_p$ with a length $L_3$. The surface 220 has a diameter $d_{10}$ substantially equal to the inside diameter of the collet 211 as similar to surface 120 of pin 110 as will become more apparent.

Figure 10:
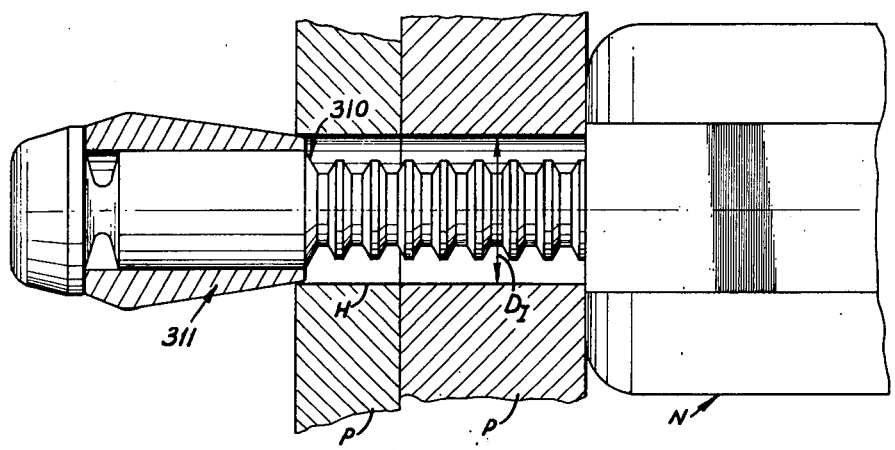
FIGS. 10–12 are enlarged views illustrating the third embodiment of the invention shown in FIG. 5 being installed.
Figure 11:
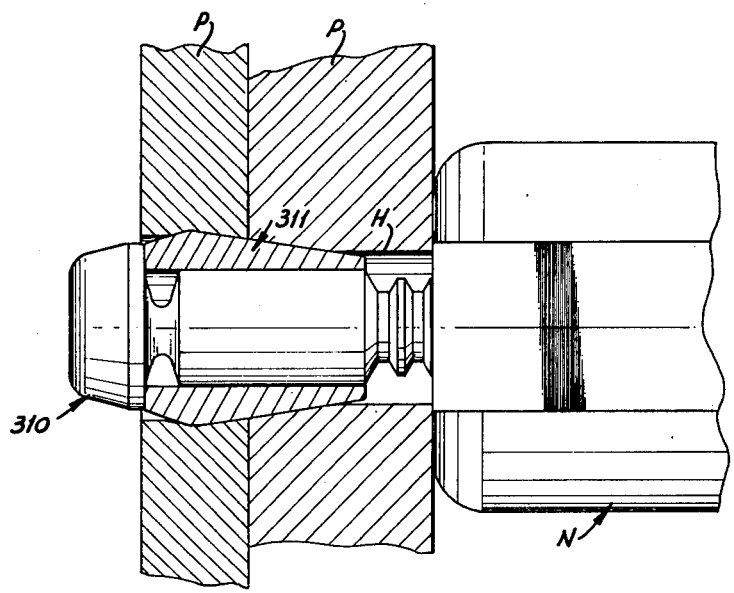
Figure 12:
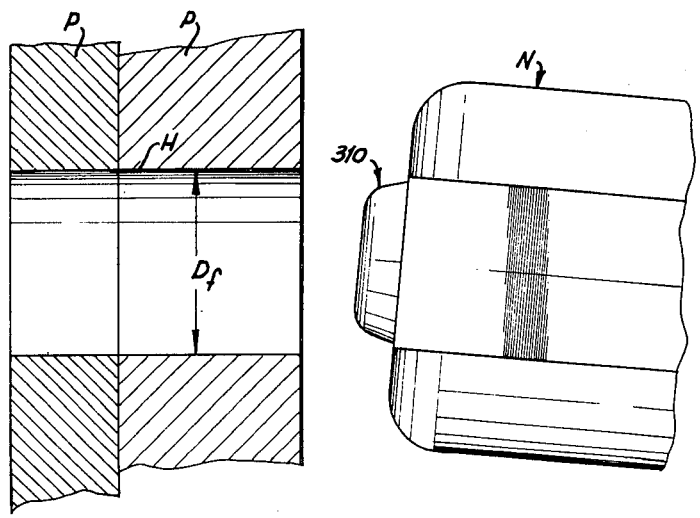

The pulling section 215 is similar to section 15 of pin 10 and includes alternate lands 230 and grooves 231 which are adapted to be gripped by a conventional lockbolt installation gun with a nose assembly N partly shown in FIGS. 10-12. The section 215 has a major outside diameter $d_{11}$ at least as small as the diameter $d_{10}$ but may be a prescribed amount smaller than diameter $d_{10}$ to insure that the collet 211 can be removed after hole expansion as will become more apparent.

The driving section 216 is similar to the driving section 16 of pin 10 and includes an annular driving shoulder 240 on the leading end thereof defining an annular driving face 241 concentric with axis $A_p$. The face 241 is oriented generally normal to axis $A_p$ and has an outside diameter $d_{12}$ a prescribed amount larger than diameter $d_{10}$ of support section 218 as will become more apparent.

The breakneck section 219 includes a breakneck groove 250 which serves to limit the force which may be exerted on pin 210 without the pin fracturing at the breakneck groove. The minimum diameter $d_{14}$ of section 219 at the breakneck groove 250 is determined by the design force at which the pin 210 is to fracture as will become more apparent. Section 219 has a length $L_4$.

The collet 211 is similar in function to collet 11 with an annular side wall 260 concentric about a central axis $A_c$. The collet 211 has a leading end 261 and a trailing end 262. Side wall 260 defines a cylindrical central passage 264 therethrough with a diameter $d_{15}$ which is just sufficient for collet 211 to be slidably received onto the support surface 220 and be in bearing support thereon. The collet 211 has a length $L_5$ substantially equal to the sum of length $L_3$ of support section 218 and length $L_4$ of breakneck section 219.

Side wall 260 defines an expansion surface 265 on the outside thereof. Surface 265 includes a frusto-conical expansion subsurface 266 which tapers outwardly from the leading end 261 of collet 211 toward its trailing end 262. Surface 265 also includes a frusto-conical contraction subsurface 268 which tapers outwardly from the trailing end 262 of collet 211 toward its leading end 261. Subsurfaces 266 and 268 are joined by a maximum diameter transistion subsurface 269. The expansion subsurface 266 has a minimum diameter $d_{16}$ at its leading end which is less than the initial hole diameter $D_I$ seen in FIG. 10. Transistion subsurface 269 has a maximum diameter $d_{18}$ a prescribed amount larger than the initial hole diameter $D_I$. The amount diameter $d_{18}$ is larger than the initial hole diameter $D_I$ depends on the amount the holes H in work pieces P are to be expanded as is normally associated with coldworking techniques. The maximum diameter $d_{18}$ is located rearwardly of the leading end 261 of collet 211 a distance $L_6$ which is less than the length $L_3$ of support section 218 so that the side wall 260 collet 211 will be adequately supported during hole expansion as will become more apparent. The contract subsurface 268 has a minimum diameter $d_{19}$ at the trailing end 262 of collet 211. Diameter $d_{19}$ is less than diameter $d_{18}$ but should be at least as great as the diameter $d_{12}$ of driving face 241 as will become more apparent.

Side wall 260 defines an annular abuttment surface 270 at the trailing end 262 of collet 211. Surface 270 is concentric about axis $A_c$ and oriented generally normal thereto so that driving face 241 engages the surface 270 to force collet 211 through holes H as seen in FIGS. 10–12.

FOURTH EMBODIMENT

Referring to FIGS. 7, 8 and 13–17, the fourth embodiment of the invention is illustrated which incorporates a threaded fastener into the drive pin. Drive pin 310 is provided with a seamless expansion collet 311 slidably received onto the drive pin 310 to allow the collet 311 to be pulled through the holes H through work pieces P to expand them with a conventional lockbolt installation gun. The difference between this embodiment and the third embodiment is that a threaded fastener 380 is used as the driving section. Those components which are the same as the third embodiment have the same reference numbers applied thereto displaced by 100.

Figure 8:
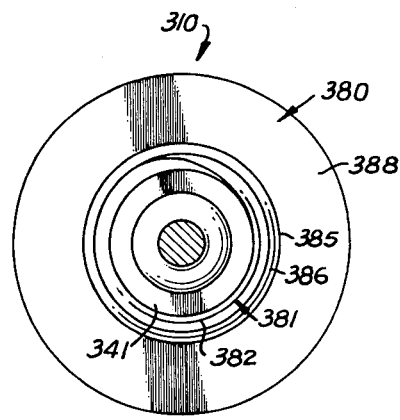
FIG. 8 is an enlarged end view taken along line 8—8 in FIG. 7.
Figure 15:
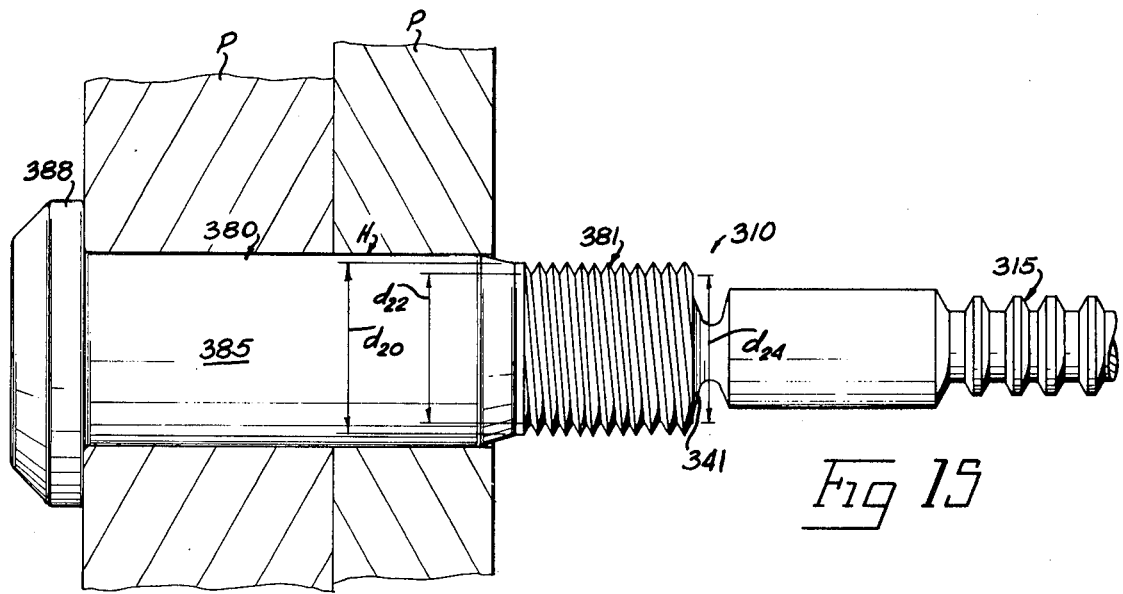

The fastener 380 is integral with the support section 318 through the breakneck section 319. Fastener 380 has an engagement section 381 at the leading end thereof which is provided with conventional threads 382 to receive a conventional nut 384 seen in FIGS. 16 and 17. The engagement section 381 has a major diameter $d_{20}$ corresponding to diameter $d_{12}$ of drive pin 210. The major diameter $d_{20}$ is defined by the crests of threads 382. It will also be noted that the threads 382 have a root diameter $d_{22}$ as best seen in FIGS. 15. The leading end of engagement section 381 has a driving shoulder 340 therearound which defines an annular driving face 341 concentric about and normal to axis $A_p$ as best seen in FIGS. 7 and 8. The driving face 341 has an outside diameter $d_{24}$ as seen in FIG. 15 at least as small as the root diameter $d_{22}$ of the threads 382 as will become more apparent.

Figure 17:
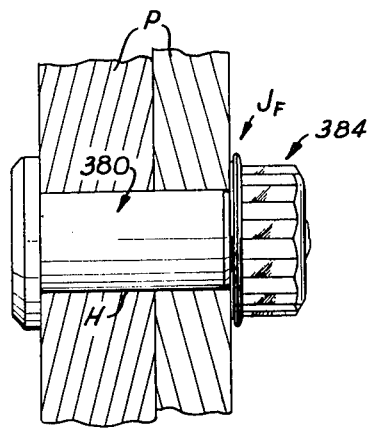

Fastener 380 also has a bearing section 385 with diameter $d_{21}$ adapted to extend through holes H through the work pieces P after they have been expanded as seen in FIGS. 16 and 17. The diameter $d_{21}$ is generally smaller than diameter $d_{18}$ on collet 311 and may be varied depending on the amount of interference which is desired between the work pieces and the fastener after installation.

The bearing section 385 is connected to the trailing end of the engagement section 381 through a lead-in section 386 normally associated with threaded fasteners. The trailing end of the bearing section 385 is provided with a conventional fastener head 388. While only an exposed head style is illustrated, any of the different known head styles may be used without departing from the scope of the invention.

Figure 13:
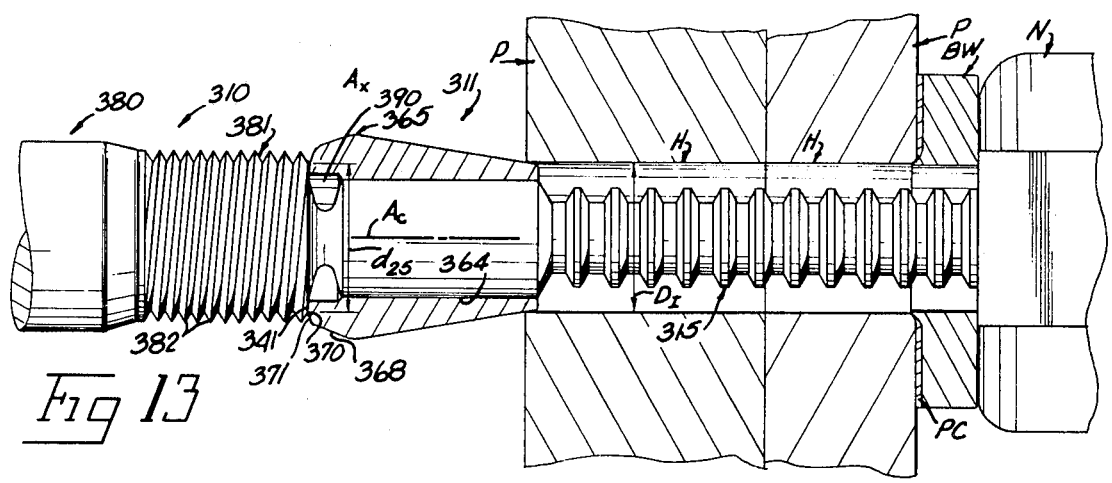
Figure 14:
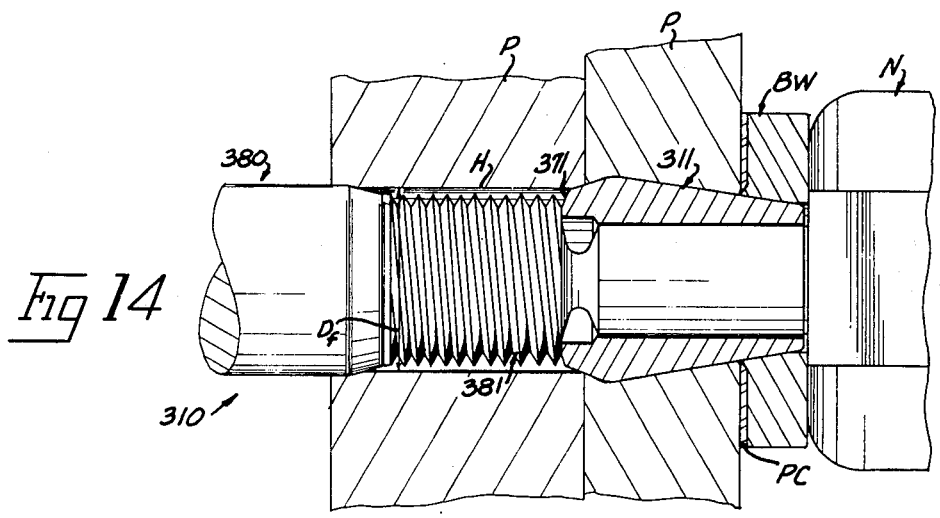

The collet 311 is similar in construction and use to collet 211. The collet 311 may be provided with a counterbore 390 as best seen in FIGS. 13 and 14 at the trailing end of passage 364 to provide a clearance over the breakneck groove 350. The length of the counterbore 390 is approximately the length of breakneck section 319 so that the collet 311 can be removed even if the unsupported trailing end of collet 311 is slightly contracted during the expansion of the holes H. The collet 311 defines an annular abuttment surface 370 at the trailing end thereof which is concentric about axis $A_C$ and oriented generally normal thereto as seen in FIG. 13. The driving face 341 engages the abuttment surface 370 to force collet 311 through the holes. It will be noted that the abuttment surface 370 has an outside diameter $d_{25}$ at least as small as the root diameter $d_{22}$ of the threads 382. A clearance surface 371 joins the peripheral edge of surface 370 with the contraction subsurface 368. Clearance surface 371 extends outwardly from and forward of abuttment surface 370 at an angle $A_X$ with the plane of surface 370. This provides clearance for the leading thread 382 so that the abuttment surface 370 will not distort this leading thread. The angle $A_X$ may be varied as required to prevent damage to thread 382, however, an angle of 5°–15° is usually sufficient.

STREAMLINE EXPANSION COLLET

Referring to FIGS. 27–29, a streamline expansion collet 711 is illustrated which may be used in lieu of the expansion collets 11, 111, 211, 311 or 411. The collet 711 may be used on any of the illustrated drive pins, however, it will be described in use on the drive pin 310.

The collet 711 is similar in overall function to collet 311 with an annular side wall 760 concentric about a central axis $A_c$. The collet 711 has a leading end 761 and a trailing end 762. Side wall 760 defines a cylindrical central passage 764 therethrough with a diameter $d_{32}$ which is just sufficient for collet 711 to be slidably received onto the support surface 320 of drive pin 310 and be in bearing support thereon. The diameter $d_{32}$ is usually no more than 0.001 inch greater than diameter $d_{10}$ of support surface 320. The collet 711 has a length $L_{32}$ substantially equal to the sum of length $L_3$ of support section 318 and length $L_4$ of breakneck section 319.

The side wall 760 includes a leading pilot section 765 and a trailing expansion section 766. The pilot section 765 defines a cylindrical pilot surface 768 on the outside thereof concentric about the collet central axis $A_c$. Pilot surface 768 has a length $L_{33}$ and a diameter $d_{33}$ sufficient to locate the collet 711 coaxially with the centerline of the holes H through the work pieces P as seen in FIG. 30 when surface 768 extends into holes H. Normally, diameter $d_{33}$ of pilot surface 768 is in the order of 0.001 inch less than the initial hole diameter $D_I$.

Expansion section 766 includes a leading expansion surface 770, an intermediate land surface 771, and a trailing contraction surface 772, all concentric about the central axis $A_c$ of collet 711. The expansion surface 770 has a leading minor diameter $d_{34}$ and a trailing major diameter $d_{35}$ where diameter $d_{34}$ is at least as small as the initial hole diameter $D_I$ and the major diameter $d_{35}$ is greater than the initial hole diameter $D_I$ by that amount which it is desired to expand holes H. If coldworking is desired, diameter $d_{35}$ is usually 2–10% greater than the hole diameter $D_I$ depending on the material of the work pieces P and the final diameter $D_f$ desired. The expansion surface 770 is semi-ellipsoidal in shape where the included angle between the tangent to surface 770 at any point decreases from the leading to the trailing end of surface 770. It will be seen that such shape for surface 770 produces an exponentially increasing mechanical advantage at the surface 770/hole interface from the leading to the trailing end of surface 770. This serves to minimize the frictional interface between the surface 770 which, in turn, reduces the force required to move the surface 770 through the holes H. Because the radial expansion forces required to expand the holes H increase exponentially with the amount of expansion, the exponentially increasing mechanical advantage of surface 770 offsets the expansion forces required to reduce force required to move the surface 770 through holes H.

The land surface 771 is cylindrical with the diameter $d_{36}$ and a length $L_{36}$. The leading end of surface 771 is joined to expansion surface 770 through a smooth transition surface 774. The length $L_{36}$ is a convenient length which allows the surface 770 to be reground without reducing diameter $d_{36}$, however, it will be noted that the length $L_{36}$ will be shortened each time the expansion surface 770 is reground.

The contraction surface 772 has the major diameter $d_{36}$ at its leading end and a minor diameter $d_{37}$ at its trailing end. The diameter $d_{37}$ is at least as small as the recovered diameter $D_R$ of the holes as seen in FIG. 31. The surface 772 has an effective surface area larger than that of the expansion surface 770 and an average mechanical advantage greater than that of surface 770. While different shapes may be used for surface 772, it is illustrated as frusto-conical defining an included angle with the axis $A_c$ less than the average included angle between the tangents to surface 770 and the axis $A_c$. The leading end of surface 772 is joined to land surface 771 through a smooth transition surface 775. As the compressive forces tending to force the holes H closed toward the recovered diameter $D_R$ are applied against the contraction surface 772 as seen in FIG. 31, these forces tend to force the expansion section 766 through the holes H. This results in reducing the force required to move the section 766 through the holes.

The trailing end of the side wall 760 defines a rearwardly facing annular abuttment face 780 concentrically located with respect to the axis $A_c$ and lying in a plane normal thereto. The surface 780 has an outside diameter $d_{38}$ which is at least as small as the root diameter $d_{22}$ of threads 382 on fastener 380 that is adapted to be engaged by driving face 341 of the fastener 380 as will become more apparent. The trailing end of side wall 760 further defines a clearance surface 781 joined to the peripheral edge of the abuttment face 780 and extending forwardly and outwardly therefrom at an angle $A_{CS}$ with the plane of face 780 to provide clearance for the leading thread 382 of the fastener 380 so that the abuttment face 780 will not distort this leading thread when the collet is forced through the holes. The angle $A_{CS}$ may be varied as required to prevent damage to the leading thread 382 of the fastener, however, an angle $A_{CS}$ of 5°–15° is usually sufficient. The outer periphery of the clearance surface 781 joins with the trailing end of contraction surface 772 through a smoothly rounded corner surface 782. The collet 711 may be provided with a clearance counterbore 784 as best seen in FIGS. 27 and 29 at the trailing end of passage 764 to provide a clearance over the breakneck groove 350 on drive pin 310. The length of the counterbore 784 is approximately the length of breakneck section 319 so that the collet 711 can be removed from drive pin 310 even if the unsupported trailing end of collet 711 is slightly contracted during the expansion of the holes H.

Because the operator who pulls the drive pin 310 into the holes H and the collet 711 through the hole works from the off side OS of the work pieces P while the collet 711 is initially located on the near side NS of the workpieces, some indication is desired as to whether the pilot section 765 has entered the holes. FIG. 30 shows an indicator which assures the operator that the pilot section 765 has entered the holes. The fastener 380 of drive pin 310 has a known grip range which varies from a minimum grip $G_1$ to a maximum grip $G_2$ as seen in FIG. 31. It will further be noted that the length $L_{33}$ of the pilot section 765 is greater than the grip range ($G_2$-$G_1$) of fastener 380 since the grip range is usually in the order of 1/16 inch for smaller diameter fasteners 380. A distinguishing indicator band 785 is provided on the pulling section 315 of drive pin 310 starting a distance $L_{37}$ forward of the driving face 341 against which collet 711 bears. Distance $L_{37}$ is equal to the sum of length $L_{34}$ of the expansion section 766 on collet 711, the maximum grip $G_2$ of fastener 380, and a small amount to be visually displayed at maximum drip but less than the sum of the total length $L_{32}$ of collet 711 and the minimum grip $G_1$. Thus, when the pilot section 765 on collet 711 is seated in holes H with the driving face 341 on drive pin 310 bearing against the abuttment face on collet 711 as seen in FIG. 30, the leading end of the indicator band 785 is visible on the off side OS of work pieces P. If the pilot section 765 is not seated, then the indicator band 785 is not visible on the off side of the work peices. In this manner, the operator can visually tell if the drive pin 310 is ready to be pulled. The indicator band 785 can be painted, coated or otherwise formed on the pulling section 315. This concept could likewise be applied to any drive member incorporating a fastener.

Any of a number of different lubricants may be used to coat the expansion, land and contraction surfaces of the collets shown herein. One lubricant which may be used is an electroplated film such as cadmium. This film flows under coldworking pressure to act as a lubricant and may be replenished by replating these surfaces. Also, a wax may be used as the lubricant. Various dry film lubricants may also be used such as the layer lattice compounds of molybdenum disulfide ($MoS_2$), tungsten disulfide ($WS_2$), graphite, and graphite floride ($CF_x$); the plastic polyimide polymers; or the calcium floride based coatings. Cetyl alcohol may also be used as a lubricant.

The material used to make the expansion sections of the collets may also be self-lubricating Alloy steels which contain free graphite are such materials. These alloy steels usually contain a relatively high carbon content, normally 1.4–1.5%, and silicon, normally 0.5–1.5% to promote the formation of microscopically fine particles of the free graphite. Other alloying elements such as manganese and molybdenum may be used to stabilize the formation of the free graphite. Such steels have the necessary hardness and strength to withstand the forces required for hole expansion. One such steel alloy which has been found satisfactory typically contains 1.45% carbon, 1.25% silicon; 1% maximum manganese and 0.25% maximum molybdenum.

CLEANING APPLICATOR

Rather than providing a lubricant on the collets, it is to be understood that the inside of the holes H may be lubricated using any of the aforementioned lubricants. FIGS. 36–40 illustrate a cleaning applicator attachment which may be used in conjunction with any of the support pins disclosed herein or with a standard fastener to apply a liquid lubricant such as cetyl alcohol or paint to the inside of the holes H immediately prior to installation of a fastener therein.

A first embodiment of the cleaning applicator is illustrated in FIG. 36 designated generally by the numeral 810. The cleaning applicator 810 is applied to the leading end of the pulling section of the support pin or a standard fastener and includes a body 811 which has a major diameter $d_{CA}$ greater than the initial hole diameter of the holes through the work pieces. The body 811 may be attached to the leading end of the pulling section in a number of ways, however, it is illustrated as being attached through an adhesive 812 in FIG. 36. The body 811 is made out of a soft absorbent resilient material such as cotton fiber so that the body 811 can be pushed through the holes in the workpieces by the leading end of the support pin or fastener as the pin or fastener is inserted through the holes in the work pieces. Because the final hole preparation sometimes leaves burrs within the holes, it will be noted that the body 811 will captivate the burr or burrs therein to clean the holes through the work pieces as the body 811 is forced therethrough. Further, it will be seen that the body 811 can have a lubricant such as cetyl alcohol or anti-corrosive paint absorbed therein to be applied to the inside of the holes through the work pieces as the body of the cleaning applicator is forced therethrough. Because the outside diameter $d_{CA}$ of the body 811 is larger than the initial diameter of the holes, the body 811 will be compressed as it is forced through the holes to squeeze the lubricant therefrom to coat the inside of the holes. After the body 811 has been forced through the holes, it is removed from the leading end of the pulling section so that the installation gun can be inserted over the pulling section to finish the installation.

FIG. 37 illustrates a second embodiment of the cleaning applicator which is designated generally by the numeral 820. The cleaning applicator 820 serves generally the same purpose as the cleaning applicator 810. Cleaning applicator 820 includes a main body 821 with a generally circular end wall 822 and an annular side wall 824 integral with the trailing outside edge of the end wall 822. The wall 824 is concentrically located about the centerline $CL_{CA}$ of the cleaning applicator 820. A cavity 825 is defined within the side wall 824 which receives the leading end of the support pin or fastener therein as seen in FIG. 37. The cavity 825 has a diameter $d_{CV}$ which is less than the major diameter $d_{PM}$ of the pulling section so that when the leading end of the pulling section is inserted into the cavity 825, the pulling section 825 is resiliently engaged by the inside edge of the side wall 824 to hold the cleaning applicator 820 in position. It will be noted that the body 821 has an outside diameter $d_{CA}$ which is larger than the initial hole diameter through the work pieces. It will also be noted that the body 821 may be made out of a soft absorbent resilient material so that the body 821 will be compressed as it is forced through the holes in the work pieces as the pulling section is inserted therethrough. Thus, the cleaning applicator 820, like the applicator 810 serves to remove any burrs from the holes through the work pieces and a lubricant may be impregnated in the body 821 so that it is squeezed onto the inside of the holes through the work pieces to coat them with the lubricant. It is further to be understood that the body 821 may be made out of a plastic encapsulating material with the lubricant encapsulated therein so that when the body 821 is compressed as it is forced through the holes, the encapsulation will be broken and the lubricant will be dispersed onto the inside of the holes to coat them.

A third embodiment of the cleaning applicator is illustrated in FIG. 38 and designated generally by the numeral 830. The cleaning applicator 830 is used similarly to the applicators 810 and 820 and includes a support body 831 adapted to be placed on the leading end of the pulling section of the support pin or fastener with a cleaning applicator pad 832 on the leading end of the support body 831. The support body 831 is generally cylindrical with a circular end wall 834 and an annular side wall 835 connected to the trailing outside edge of the end wall 834 concentrically about the centerline $CL_{CA}$ of the cleaning applicator 830. The side wall 835 defines a rearwardly opening cavity 836 therein into which the leading end of the pulling section is inserted. The trailing end of the side wall 835 defines an inwardly directed lip 838 thereon which resiliently engages the pulling section to hold the cleaning applicator 830 in position on the leading end thereof. It will be noted that the support body 831 has an outside diameter $d_{OD}$ which is less than the inside diameter of the holes through the work pieces so that the body 831 can freely pass therethrough on the pulling section. The pad 832 is generally disk-shaped with an outside diameter $d_{CA}$ which is larger than the inside diameter of the holes through the work pieces. The pad 832 is made out of soft absorbent resilient material which may be compressed as the cleaning applicator 830 is forced through the holes H in the work pieces P illustrated in FIG. 39. Thus, it will be seen that the pad 832 serves to clean any burrs from the inside of the holes and, if a lubricant is contained therein, it will be squeezed out of the pad 832 as it is compressed to coat the inside of the holes H with a lubricant. After the cleaning applicator has been forced through the holes, it may be removed from the leading end of the pulling section as illustrated in FIG. 40 so that the installation gun may be inserted over the pulling section for installation.

FIFTH EMBODIMENT

Referring to FIGS. 9 and 18–20, the fifth embodiment of the invention is illustrated which incorporates a lockbolt into the drive pin. Drive pin 410 slidably receives expansion collet 411 thereon to allow the collet 411 to be pulled through the holes H through work pieces P to expand them with a conventional lockbolt installation gun. The difference between this embodiment and the third embodiment is that a lockbolt 480 is used as the driving section. Those components which are the same as the third embodiment have the same reference numbers applied thereto displaced by 200.

Figure 20:
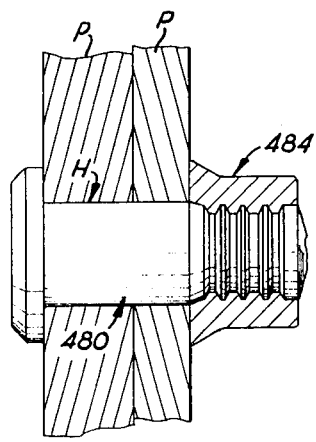

The lockbolt 480 is integral with the support section 418 through the breakneck section 419. The lockbolt 480 has an engagement section 481 at the leading end thereof which is provided with conventional locking grooves 482 into which a conventional collar 484 is swaged as seen in FIG. 20. The engagement sction 481 has a major diameter $d_{30}$ corresponding to diameter $d_{12}$ of drive pin 210. The leading end of engagement section 481 has a driving shoulder 440 therearound which defines an annular driving face 441 concentric about and normal to axis $A_p$ as best seen in FIGS. 9 and 18.

Figure 19:
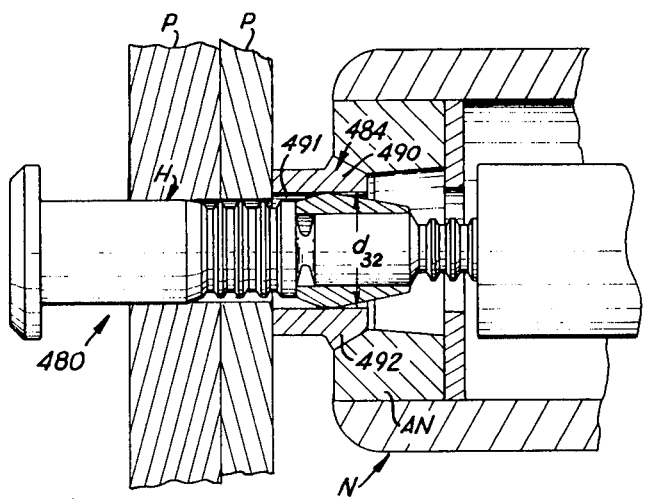

Lockbolt 480 has a bearing section 485 with diameter $d_{31}$ adapted to extend through holes H through the work pieces P after they have been expanded as seen in FIGS. 19 and 20. The diameter $d_{31}$ is generally smaller than diameter $d_{18}$ on collet 411 and may be varied depending on the amount of interference which is desired between the work pieces and the fastener after installation.

The bearing section 485 is connected to the trailing end of the engagement section 481 through a lead-in section 486. The trailing end of the bearing section 485 is provided with a conventional fastener head 488. While only an exposed head style is illustrated, any of the different known head styles may be used without departing from the scope of the invention.

Figure 18:
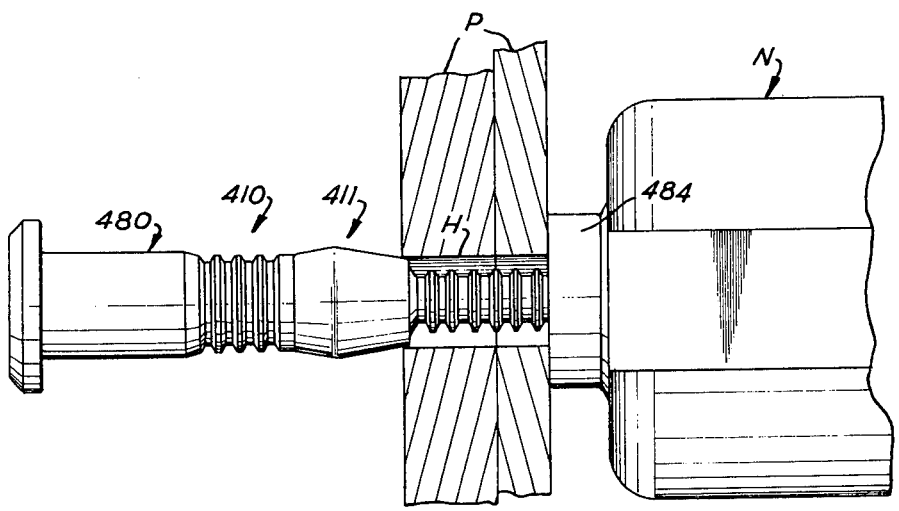
FIGS. 18–20 are enlarged views illustrating the fifth embodiment of the invention shown in FIG. 9 being installed.

The collar 484 illustrated in FIGS. 18–20 is similar to that normally associated with lockbolts so that it can be swaged around the engagement section 481. If it is desirable to completely install the lockbolt 480 in a single operation, the side wall 490 of the collar should have a passage 491 therethrough of a diameter $d_{32}$ as large as the maximum diameter $d_{18}$ so that the collet 411 can be pulled therethrough before the collar is swaged. The bead 492 engaged by the anvil AN in the nose assembly N as seen in FIGS. 18 and 19 should allow the holes to be expanded and the collet 311 to pass therethrough before the swaging occurs.

PRELOAD ADAPTER

Figure 21:
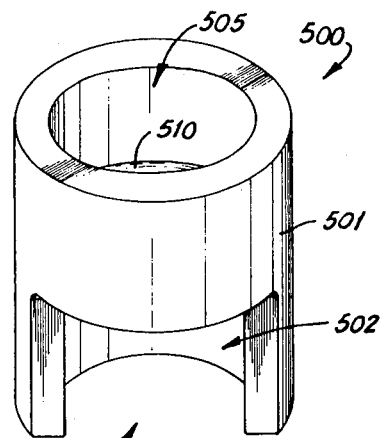
FIG. 21 is a perspective view of the preload adapter of the invention.
Figure 22:
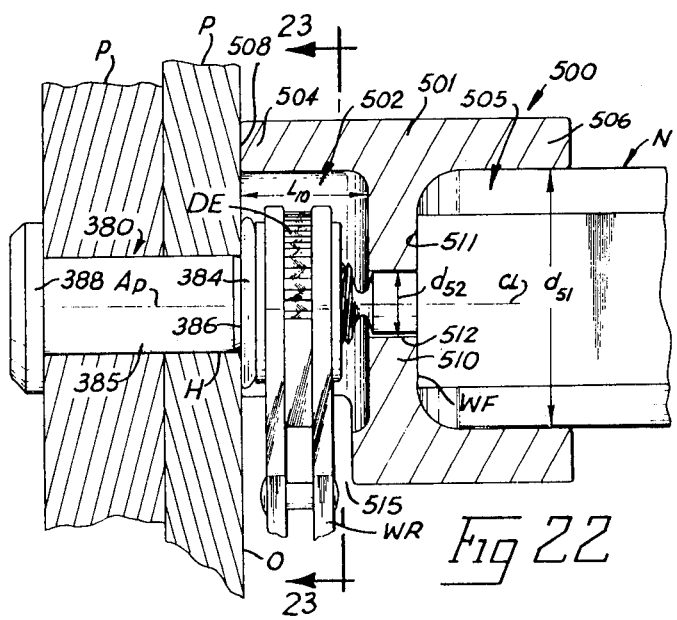
FIG. 22 is a partial cross-sectional view illustrating the fourth embodiment of the invention being installed with the preload adapter of FIG. 21.
Figure 23:
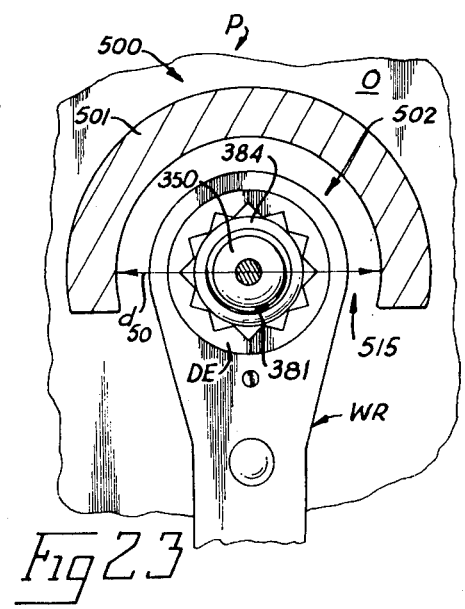
FIG. 23 is a cross-sectional view taken along line 23—23 in FIG. 22.

Referring to FIGS. 21–23, a preload adapter 500 is illustrated for use with a wrench WR and a conventional lockbolt pulling gun to install the fastener 380 with a prescribed preload in the resulting fastener joint. The adapter 500 includes an upstanding cylindrical side bearing wall 501 with centerline CL. The side bearing wall 501 defines a generally cylindrical wrenching chamber 502 opening on the bearing end 504 thereof concentric about centerline CL and a generally cylindrical guide chamber 505 opening on the opposite guide end 506 thereof also concentric about centerline CL. The wrenching chamber 502, has a diameter $d_{50}$ sufficient to allow the wrench WR to be operated therein as will become more apparent and guide chamber 505 has a diameter $d_{51}$ sufficient to receive the nose assembly N of the lockbolt installation gun therein as seen in FIG. 22. The bearing end 504 of wall 501 about chamber 502 defines an arcuate bearing face 508 oriented generally normal to the centerline CL adapted to bear against the off side of the work pieces P as seen in FIG. 22 about the projecting engagement section 381 of fastener 380.

An intermediate bearing wall 510 extends transversely of and is connected to side bearing wall 501 to separate chambers 502 and 505. That side of intermediate bearing wall 510 opposite the bearing face 508 defines a bearing surface 511 thereon generally normal to centerline CL so that the working end of the nose assembly N can bear thereagainst as will become more apparent. The intermediate bearing wall 510 is spaced from the bearing face 508 a prescribed distance $L_{10}$ seen in FIG. 22 to allow the wrench WR to operate as will become more apparent. The intermediate bearing wall 510 defines an access passage 512 through the center thereof concentrically about centerline CL with a diameter $d_{52}$ to slidably receive the pulling section 315 of pin 310 therethrough as seen in FIG. 22. The diameter $d_{52}$ is usually selected so that the bearing section 318 of drive pin 310 will pass therethrough with a close fit to hold the adapter 500 centered over the fastener 380.

A portion of the side bearing wall 501 at chamber 502 is cut away to provide a side access opening 515 to the wrenching chamber 502 when the adapter 500 is in position as seen in FIGS. 22 and 23. The opening 515 has a width $w_{53}$ and a height $h_{54}$ to provide adequate clearance to operate wrench WR as will become more apparent.

An alternate preload adapter 525 is seen in FIGS. 32-34 for use similarly to the adapter 500 with a conventional lockbolt pulling gun to install the fastener 380 with a prescribed preload in the resulting fastener joint. The adapter 525 includes generally a main body 526 with a centerline $CL_{PA}$. The main body 526 includes an end bearing wall 528 circular in shape which is oriented generally perpendicular to the centerline $CL_{PA}$. An annular guide wall 529 is integral with and extends outwardly from one side of the bearing wall 528 concentrically about the centerline $CL_{PA}$. Thus, it will be seen that a guide chamber 530 is defined by wall 529 and wall 528 with an open mouth 531 at the projecting end of wall 529. The chamber 530 has a diameter $d_{55}$ which is sufficient to just receive the nose assembly N of the lockbolt pulling gun therein so that the working face WF of the nose assembly N bears against the bearing surface 532 in chamber 530 on end wall 528. The end wall 528 defines a central passage 533 therethrough concentrically arranged about the centerline $CL_{PA}$ with a diameter $d_{56}$ sufficiently large to receive the pulling section 315 and the support section 318 of the drive pin 310 therethrough. If the diameter $d_{56}$ is selected so that a close fit is obtained with support section 318, the passage 533 serves to center the adapter 525 about pin 310. The opposed face 534 of the end bearing wall 528 is adapted to face the engagement section 302 of the fastener 380 as seen in FIG. 34. At least a pair of internally threaded holes 535 are defined in the bearing wall 528 and are located on diametrically opposite edges of the bearing wall 528 so that each of the passages has a centerline $CL_P$ oriented generally parallel to the centerline $CL_{PA}$ of the adapter and spaced outwardly of the centerline $CL_{PA}$ by a distance $L_{55}$. Each of the passages 535 opens onto the opposed face 534 of the bearing wall 528 with diameter $d_{57}$ as will become more apparent.

Shoulder bolts 540 are provided to be screwed into the passages 535 to space the opposite face 534 of the bearing wall 528 a prescribed distance $d_x$ from the work pieces P as seen in FIG. 34. The shoulder bolts 540 each include a shank 541 with a head 542 at one end thereof and an externally threaded engagement section 544 at the opposite end thereof. A shoulder 545 is defined on the shank 541 at its juncture with the threaded engagement section 544. The shoulder 545 has a diameter $d_{58}$ which is larger than the diameter $d_{57}$ of the engagement section 544. The engagement section 544 has a length less than the depth of the passage 535 so that the section 544 can be screwed into the passage 535 to locate the centerline $CL_{SB}$ of bolt 540 parallel and displaced from the centerline $CL_{PA}$ of the adapter. That side of the head 542 opposite the shank side 541 is provided with a flat bearing face 546 which is spaced from the shoulder 544 by distance $d_x$. The shoulder bolt 540 may be acquired in different lengths so that the distance $d_x$ of the opposed face 534 of the bearing wall 528 as spaced from the work pieces P can be varied. It will also be noted that it may be desirable to have the shoulder bolt 540 on one side of the adapter 545 at a first length $d_{x1}$ and the other shoulder bolt 540 a length $d_{x2}$ as seen in FIG. 34 where the adapter 525 is to be used with work pieces which do not have the same level on opposite sides of the holes H through the work pieces. Thus, it will be seen that when the shoulder bolts 540 are installed in the passages 535, a working space 550 is provided between the bolts 540 and the bearing wall 528 to clear a nut to be tightened onto the fastener 380.

While a conventional wrench such as the wrench WR disclosed for use with the preload adapter 500 may be used with the adapter 525, a modified wrench $WR_M$ is shown in FIG. 34 which is captivated onto the adapter 525 and forms a part thereof. The wrench $WR_M$ has a nut driving element $DH_M$ which is rotably mounted on the driving handle $DH_M$ so that the driving element $DE_M$ can ratchet in one direction and drive in the other as the handle $DH_M$ is rotated. It will be seen that the offside of the driving element $DE_M$ defines an annular retaining recess $RR_M$ on one of its ends projecting beyond the handle $DH_M$. The retaining recess RR is concentric about the axis $A_{DE}$ of the driving element $DE_M$. An annular retaining flange 551 is provided on the opposite face 534 of the bearing wall 528 which is located concentrically about the centerline $CL_{PA}$ of the adapter 525. The retaining flange 551 includes an annular spacing leg 552 which projects outwardly from the surfce 534 generally parallel to the centerline $CL_{PA}$ with an inside diameter $d_{59}$ larger than the outside diameter of the projecting end of the driving element $DE_M$. The projecting end of the spacing leg 552 is provided with an inwardly directed retaining lip 554 which projects into the retaining recess $RR_M$ about the driving element $DE_M$ to maintain the axis $A_{DE}$ of the driving element $DE_M$ coaxial with the centerline $CL_{PA}$ of the adapter 525. It will be noted that the lip 554 is loosely received in the retaining recess $RR_M$ so that the driving element $DE_M$ is freely rotatable with respect to the body 526 yet the axis $A_{DE}$ is maintained coaxially with the centerline $CL_{PA}$. It will thus be seen that the shoulder bolts 540 also serve to locate the wrench $WR_M$ with respect to the fastener 380.

While a nut such as the nut 384 seen in FIGS. 17, 22 and 23 may be installed with the adapter 525, it is especially useful in installing nuts with a frangible driving portion such as those disclosed in U.S. Pat. No. 2,940,495 and illustrated in FIG. 34 as nut 555. The nut 555 has a collar 556 which is internally threaded to threadedly engage the engagement section 381 of the fastener 380 and a wrenching section 558 on the projecting end of the collar 556 which defines wrenching surfaces 559 thereon and which is connected to the collar 556 through a torque limiting groove 560 adapted to shear under a prescribed torque applied to the wrenching section 558 and separate the wrenching section 448 from the collar 556 at the groove 560. Because these torque limiting nuts 555 have normally been made out of aluminum alloys, a great deal of difficulty has been encountered in applying the desired amount of preload to the fastener joint $J_{F1}$ using only the nut 555 to apply the preload. This is because the threads in the nut, while being able to withstand the preload, were destroyed or damaged due to the frictional contact of the threads of the nut with the threads on the fastener as it was torqued into position. On the other hand, when the adapter 525 is used, the preload is applied with the nose assembly N rather than attempting to preload the joint using the nut 555. This reduces the frictional interface between the threads in the nut 555 and the threads on the fastener 380 so that the threads of the nut are not damaged or destroyed. The groove 560 may be increased in depth so that the wrenching section 558 will be sheared from the collar 556 at a lower torque which is just sufficient to overcome the torque of the locking feature normally provided in the nut to just seat the nut onto the work pieces. Once the nut has been seated, it locks in the preload on the fastener and is insured of maintaining this preload since the threads are not damaged.

PUSH-PULL MANDREL

Figure 24:
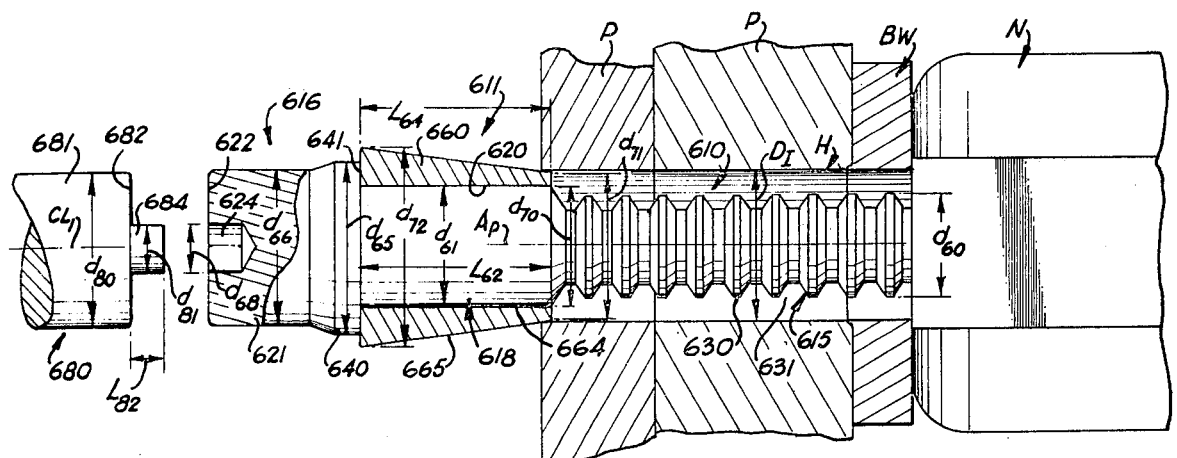
FIG. 24 is an exploded view showing a push-pull mandrel assembly.
Figure 25:
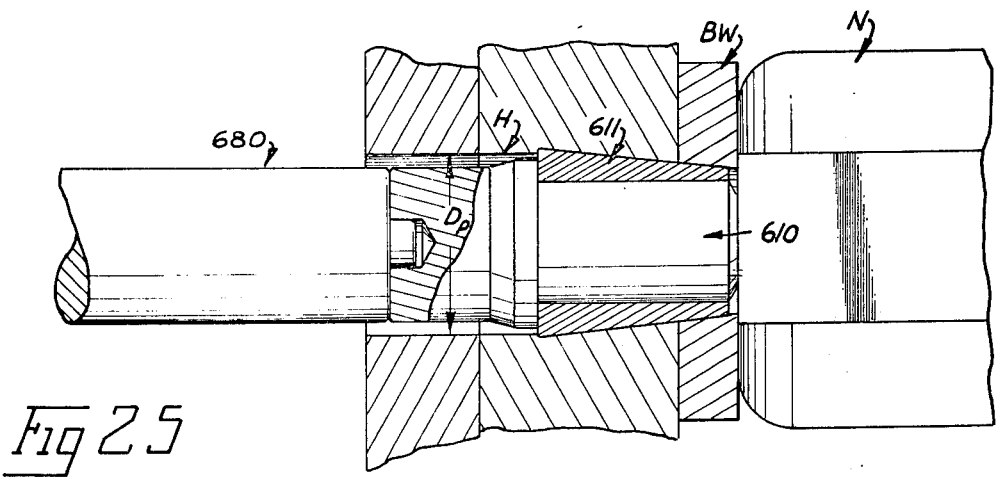
FIG. 25 is a view similar to FIG. 24 showing the pushpull mandrel assembly in use.

Referring to FIGS. 24 and 25, another embodiment of the mandrel assembly is illustrated which is designed for use in enlarging large diameter holes. This embodiment includes a drive pin 610 and a seamless expansion collet 611 similar to drive pin 110 and collet 111.

The drive pin 610 as seen in FIG. 24 includes a pulling section 615, a driving section 616, and a support section 618 connecting the trailing end of pulling section 615 with the leading end of the driving section 616. The pulling section 615 has a major outside diameter $d_{60}$ and is provided with alternating lands 630 and grooves 631 adapted to be engaged by the nose assembly N of a conventional lockbolt installation gun LG seen in FIG. 35. The support section 618 defines a cylindrical bearing surface 620 thereon concentrically about the axis $A_p$ of pin 610 and with a diameter $d_{61}$ to support the collet 611 thereon. The length $L_{62}$ corresponds to the length $L_{64}$ of collet 611.

The driving section 616 includes an annular driving shoulder 640 at the leading end thereof with an annular driving face 641 thereon. The driving face 641 has a diameter $d_{65}$, is concentrically arranged about the axis $A_p$ and lies in a plane generally normal to the axis $A_p$. The section 616 also includes a cylindrical driving extension 621 on the trailing end thereof concentric about axis $A_p$ with an outside diameter $d_{66}$ slightly smaller than the diameter $d_{65}$ as will become more apparent. The extension 621 defines a rearwardly facing driven face 622 on the trailing end thereof. The extension 621 also defines a pilot hole 624 therein which opens onto the face 622. The hole 624 is also concentric with axis $A_p$ and has a diameter $d_{68}$ smaller than diameter $d_{66}$ as will become more apparent.

The collet 611 has a seamless side wall 660 defining a cylindrical passage 664 therethrough concentric abot axis $A_c$ and extending from the leading end 661 to the trailing end 662 of the collet. The passage 664 has a diameter $d_{70}$ substantially equal to diameter $d_{61}$ of support surface 620 on pin 610 so that the collet 611 will be slidably received over the support section 618 and be supported thereon. The side wall 660 defines a frustoconical preliminary expansion surface 665 thereon which tapers outwardly from minimum diameter $d_{71}$ at the leading end of collet 611 to a maximum diameter $d_{72}$ adjacent the trailing end of the collet. It will be seen in FIG. 24 that the diameter $d_{71}$ is less than the initial hole diameter $D_1$ and that diameter $d_{72}$ is slightly less than the diameter to which the holes are to be expanded, usually in the order of 0.002-0.004 inch less, as will become more apparent.

A driver 680 is provided for use in engaging the driven face on drive pin 610 to push the drive pin 610 through the holes. The driver 680 includes a forwardly extending cylindrical driving projection 681 with a diameter $d_{80}$ corresponding to the diameter $d_{66}$ of extension 621 on pin 610. The forward end of projection 681 defines a working face 682 thereon generally normal to the centerline $CL_1$ of projection 681. A pilot pin 684 centered on face 682 projects forwardly thereof with a diameter $d_{81}$ such that pilot pin 684 will be slidably received in the hole 624 in drive pin 610 as seen in FIG. 25. The length of $L_{82}$ of pilot pin 684 is such that the working face 680 on projection 681 will bear against the trailing driven face 622 of drive pin 610 before the pilot pin 684 bottoms in pilot holes 624. The trailing end (not shown) of the driver 680 is constructed to be connected to a driving device such as rivet gun RG seen in FIG. 35 to exert an axially directed force on the trailing end of drive pin 610 through the driver 680 as will become more apparent. The pilot pin 684 serves to keep the driver 680 centered on drive pin 610 as it is driven through the holes.

Figure 35:
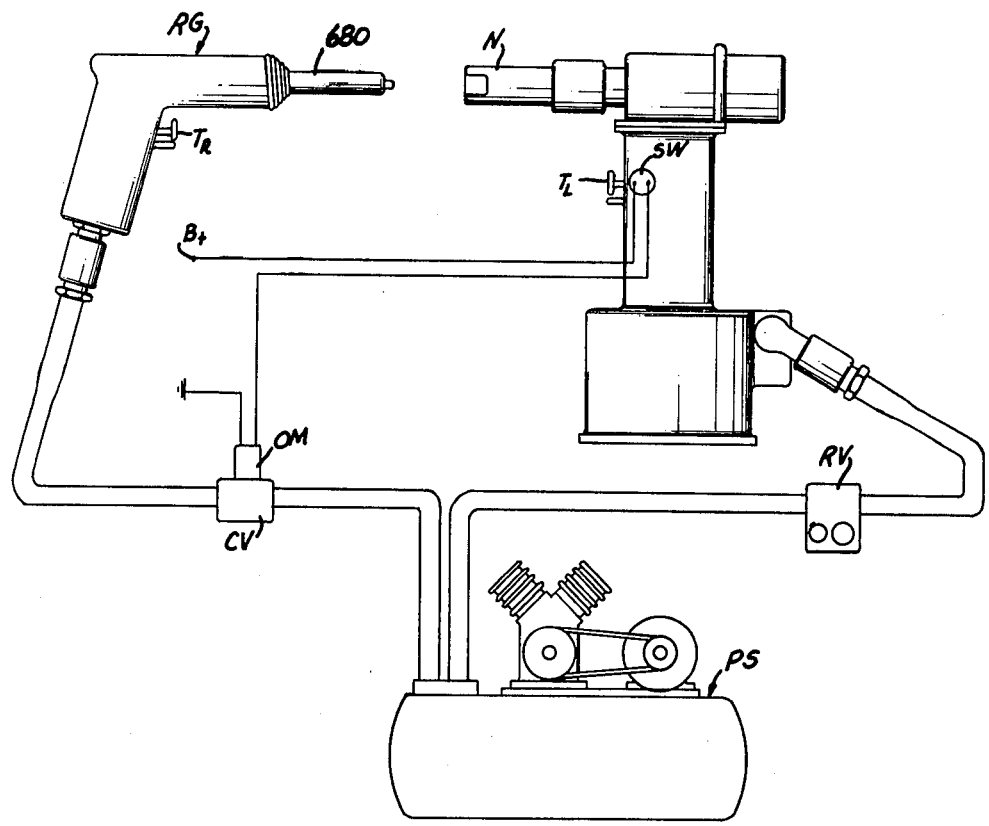
FIG. 35 is a schematic view of the tools for carrying out the method of the invention.

One arrangement for exerting a pushing and pulling force on the push-pull mandrel assembly is illustrated in FIG. 35 and designated generally TA. The arrangement TA includes a conventional lockbolt installation gun LG which carries nose assembly N and a conventional rivet gun RG which carries driver 680. The lockbolt gun has an activating trigger $T_L$ and the rivet gun RG has an activating trigger $T_R$. The lockbolt gun LG is connected to a conventional fluid pressure source PS through an adjustable regulator valve RV and the rivet gun RG is connected to the fluid pressure source PS through a cut-off valve CV with an operating mechanism OM. The cutoff valve CV serves to disable the rivet gun RG until the lockbolt gun LG is activated to prevent the work pieces from carrying the full load of the rivet gun. The operating mechanism OM is appropriately connected to the lockbolt gun LG so that valve CV supplies fluid under pressure to the rivet gun RG when the lockbolt gun is activated. One such connection is illustrated as a switch SW electrically connected to mechanism OM as a solenoid.

DETACHABLE PINTAIL

FIG. 41 illustrates another version of the drive pin of FIG. 7 which has a detachable rather than a frangible pintail. The drive pin 910 of FIG. 41 is the same as drive pin 310 except that a connection means 919 is substituted for the breakneck section 319 on pin 310. Corresponding parts of pin 910 with pin 310 have like references applied thereto displaced by 600. For sake of brevity, only the connection means 919 will be described in detail.

The trailing end of the support section 918 has a rearwardly facing trailing face 921 thereon from which a cylindrical locking pin 922 projects rearwardly. The locking pin 922 has a pair of opposed arcuate locking flanges 924 at the trailing end thereof which project outwardly therefrom. A space 925 is defined between the leading face of the flanges 924 and the trailing face 921 of support section 918. The locking pin is concentric about the axis $A_{PT}$ of the pintail PT formed by the support section 918 and pulling section 915.

The leading end of the engagement section 981 has a passage 926 which is concentric about the fastener axis $A_{PF}$ and opens onto driving face 941. A pair of opposed inwardly directed lips 928 project into the leading end of passage 926 so that the locking pin 922 and flanges 924 can be inserted in passage 926 when the fastener 980 and pintail PT have one relative rotational position. The pintail is then rotated relative to fastener 980 so that lips 928 engage flanges 924 to lock pintail PT coaxially onto fastener 980 with the trailing face 921 on pintail PT abutting the leading end of the engagement section 981 of fastener 980. The drive pin 910 is now ready for use similarly to drive pin 310.

OPERATION

Because the first three embodiments of the invention expand holes through work pieces in the same general fashion, only the third embodiment will be described in detail, it being understood that those portions of the third embodiment which are common to the first two embodiments would operate similarly.

As seen in FIG. 10, the collet 211 has been placed around the support section 218 so that the support surface 220 is in bearing support with the passage 264 through the collet 211. The abutment surface 270 at the trailing end of the collet 211 is bearing against the driving face 241 of the driving section 216. The leading end of the drive pin 210 is inserted through the holes H in the work pieces P and the pulling section 215 is inserted into the nose assembly N of a conventional lockbolt installation gun. In this position, it will be noted that the leading end 261 of the collet 211 is now extending into the holes H until the expansion subsurface 266 is bearing against the holes.

As seen in FIG. 11, when the lockbolt installation gun is activated, the drive pin 210 is pulled toward the nose assembly N which serves to force the collet 211 through the holes H. As the collet 211 moves through the holes H, the holes are expanded by the expansion subsurface 266 out through the transition subsurface 269. Because the material of the work pieces about the holes exert an inward compressive force on the material immediately adjacent the holes after expansion, the material about the holes recovers somewhat along the contraction subsurface 268 to the final diameter $D_f$ as best seen in FIG. 12. After the collet 211 has been moved completely through the holes H, it will be seen that the holes have a diameter $D_f$ and the drive pin 210 and collet 211 are removed with the nose assembly N. Because the nose assembly N is a self-releasing type, the drive pin 210 and collet 211 can be removed therefrom and reinserted through another hole to repeat the operation.

Because the collet 211 is separate from the support pin 210, it can be hardened as hard as possible in order that the expansion surface 265 can be polished very smooth and exhibit good wear resistance. Thus, potential damage to the expansion surface 265 is reduced because of the hardness of the collet 211. The drive pin 210, on the other hand, does not need to be as hard as the collet 211 and therefore can be adjusted in strength to give the maximum toughness against breaking as the collet 211 is pulled through the holes H. Because the collet 21 is supported as it is pulled through the holes H, the tendency of the collet 211 to crack because of its hardness is reduced.

The breakneck grooves 250 can be properly sized so that if an oversized collet 211 is placed thereon, the reaction force exerted on the drive pin 210 through the collet 211 will be sufficient to cause the breakneck section 219 to fracture at the breakneck groove 250 and prevent the hole being overexpanded. Whilt it is a simple matter to expand an underexpanded hole further, an overexpanded hole cannot be reduced in diameter.

The installation of the threaded fastener of the fourth embodiment of the invention is illustrated in FIGS. 13–17, 22 and 23. It is to be understood that the expansion of the holes H using the collet 311 is the same as that disclosed for the third embodiment of the invention. Referring to FIG. 13, it will be seen that the collet 311 is assembled onto the drive pin 310 until the passage 364 in the collet 311 is in bearing contact with the support surface 320 on the support section 318. The abutment surface 370 is also bearing against the driving face 341 on the end of the engagement section 381. The leading end of the drive pin 310 is inserted through the holes H and the pulling section 315 is gripped by the nose assembly N of a conventional lockbolt installation gun. When the holes H are to be significantly expanded, a backup washer BW such as that disclosed in my U.S. Pat. No. 3,805,578 may be positioned between the nose assembly N and the offside of the work pieces P as illustrated in FIGS. 13 and 14 to prevent a lip from being extruded about the holes on the offside of the work pieces. The backup washer BW may have a protective coating PC such as plastic or paint on its face bearing on work pieces P.

When the installation gun is activated, the nose assembly N pulls the drive pin 310 toward the nose assembly N thereby forcing the collect 311 through the holes H to expand same. As the collect 311 passes through washer BW it also expands the hole WH therethrough. It will be noted that the major diameter $d_{20}$ of the engagement section 381 is less than the final diameter $D_f$ of the holes H through the work pieces so that the engagement section 318 passes centrally through the holes H after expansion without contacting the edges of the hole. It will further be seen in FIG. 14 that the bearing section 385 of the fastener 380 is pulled into the holes behind the collect 311. If an interference fit is desired, it will be seen that the diameter $d_{21}$ of the bearing section 385 is larger than the final diameter $D_f$ of the holes H by the amount of interference desired. In an interference installation, the lead-in section 386 serves to re-expand the holes H so that the bearing section 385 can pass into interference with the holes. As the nose assembly N continues to pull the drive pin 310 toward the nose assembly N, the collet 311 passes through the holes H, the backup washer and into the nose assembly N. The bearing section 385 is also pulled into the holes H until the head 388 bears against the opposite side of the work pieces from the nose assembly N. The working pressure on the lockbolt installation gun may be set such that the drive pin 310 will fracture at the breakneck groove 350 or if the working pressure is lowered, the support section 318 and pulling section 315 may be left in place on fastener 380 when a self-releasing nose assembly is used. If the support section 318 and pulling section 315 are left in place, they can be used to facilitate the installation of the nut 384 onto the engagement section 381. Basically, the support section 318 and pulling section 315 may be removed by fracturing the drive pin 310 at the breakneck groove prior to the installation of the nut 384 thereon if the interference between the bearing section 385 of the fastener 380 and the holes through the work pieces is sufficiently great to permit the nut 384 to be torqued into position.

The installation of the fastener 380 on drive pin 310 when using the streamline collet 711 as illustrated in FIGS. 30 and 31 and is quite similar to that disclosed using collet 311. Therefore, only the differences in installation with collet 711 will be described. When the collet 711 is in place on drive pin 310 and the assembly inserted in the holes H as seen in FIG. 30, the operator visually checks to see if the indicator land 785 projects from the offside OS of work pieces P to insure that the pilot section 765 is seated in the holes H. If section 765 is seated, he pushes the nose assembly N onto the pulling section 315 and proceeds as described above. As the collet 711 is forced through the holes H, the combination of expansion surface 770 and contraction surface 772 minimizes the force required to pull drive pin 310 into the holes H.

If the support section 318 and pulling section 315 are left intact, then the collet 311 as seen in FIG. 15 or collet 711 can be slipped from over the support section 318 and pulling section 315. Thereafter, the nut 384 or 555 can be inserted over the pulling section 315 and support section 318 so that it can be screwed onto the threads 382. It will be noted that at this point the diameter $d_{10}$ of the support section 318 and the diameter $d_{11}$ of the pulling section 315 are both smaller than the minor diameter of the threads 382 or the inside diameter of the nut 384 or 555 so that the nut 384 or 555 can be slipped thereover. Preferably, the major diameter $d_{11}$ of the pulling section 315 would be made one standard diameter smaller than the pintail associated with a standard lockbolt having the same working diameter as the fastener 380 so that a standard diameter nose assembly N can be used.

When the support section 318 and pulling section 315 are left intact with fastener 380, two alternative techniques are illustrated for tightening the nut 384 or 555 on the engagement section 381. The first alternate is illustrated in FIG. 16 to be used where the preload on the resulting joint is not critical and the second alternate is illustrated in FIGS. 22, 23 and 24 where a prescribed preload is to be exerted on the resulting joint.

When the first alternative is used, a holding tool such as a pair of pliers PL seen in FIG. 16 may be used to grip the pulling section 315 while a conventional wrench WR also seen in FIG. 16 is used to torque the nut 384 into position. After the nut 384 has been torqued into position, the support section 318 and pulling section 315 can be removed either by striking these sections with a lateral blow or by reinserting the nose assembly N of the installation gun back onto the pulling section 315 and fracturing the breakneck section 319. The nut 555 would be installed similarly.

When the second alternative illustrated in FIGS. 22 and 23 is used, the preload adapter 500 is used in combination with a lockbolt installation gun having a nose assembly N and a wrench WR. While different kinds of wrenchs WR may be used, the wrench illustrated in FIGS. 22 and 23 is a conventional ratchet end wrench which allows the nut driving element DE to ratchet in one direction and drive in the other. To finalize the installation, the nut 384 is started on the engagement section 381 of fastener 380 and wrench WR drivingly positioned on the nut. Next, the adapter 500 is positioned over the projecting pulling section 315 and support section 318 so that these sections extend through the access passage 512 into the pulling chamber 505. In this position, the wrench WR projects out through the access opening 515 in side bearing wall 501 and the bearing face 508 bears against the offside O of the work pieces P about nut 384. The nose assembly N is then reinserted back over the pulling section 315 until its working face WF bears against the bearing surface 511 on intermediate wall 510. The working pressure to the lockbolt installation gun is adjusted in known manner to exert a prescribed minimum preload force on the fastener 380 through the pulling section 315 and nose assembly N. One way to set the minimum preload force is using a conventional force gauge especially adapted for use with lockbolt installation guns. The breakneck section 319 serves to limit the maximum preload force which may be applied. The installation gun is activated to preload the fastener 380 and the wrench WR used to tighten the nut 384 while this preload is maintained. The nut 384 thus locks the preload into the fastener 380 to assure the desired preload on the joint. The pulling section 315 and support section 318 are removed either by increasing the working pressure of the lockbolt installation gun to break the pin 310 at breakneck groove 350 or by removing the nose assembly N and adapter 500 and striking the projecting sections with a lateral blow to break pin 310 at groove 350; Preferably, a non-axial force such as the lateral blow should be used to break pin 310 at groove 350 since the shock at breakage with an axial force significantly reduces the original preload.

The completed joint $J_F$ is illustrated in FIG. 17 after sections 315 and 318 have been removed. The joint $J_F$ looks the same without regard to which alternative is used.

When the second alternative illustrated in FIG. 34 is used, the preload adapter 525 is used in combination with a lockbolt installation gun having a nose assembly N. The appropriate shoulder bolts 540 are selected to give the desired distance $d_x$ between the end bearing wall 528 and the work pieces P. To finalize the installation, the nut 555 is started on the engagement section 381 of fastener 380 and the adapter 525 placed over the pulling section 315 and support section 318 using the handle $DH_M$ so that as the driving element $DE_M$ drivingly engages the wrenching surfaces 559 on the wrenching section 558. The handle $DH_M$ may be manipulated to screw the nut 555 onto the engagement section 381 until the nut 555 is almost seated against the offside OS of the work pieces P. At this point, the nose assembly N is inserted over the pulling section 315 of the drive pin 310 until the working face WF of the nose assembly N is bearing against the bearing face 532 in chamber 530. The working pressure through the lockbolt installation gun has been adjusted as described hereinabove and the installation gun is activated to preload the fastener 380 with a prescribed force. The handle $DH_M$ is then further manipulated to fully seat the collar 556 onto the offside OF of the work pieces P and then additional force is applied through the handle $DH_M$ to cause the wrenching section 558 to be separated from the collar 556 at the groove 560. The nut 555 in this position serves to lock the preload exerted on the fastener 380 by the nose assembly N to assure the desired final preload on the joint $J_{F1}$. The pulling section 315 and support section 318 of the drive pin 310 are then removed by breaking the drive pin 310 at the breakneck groove 350, preferably with a non-axial force such as a lateral blow as described hereinabove.

The installation of the fifth embodiment of the invention is illustrated in FIGS. 18–20. While FIGS. 18–20 illustrate the fifth embodiment of the invention being installed in a single operation, it is to be understood that it may be installed as a two-step operation by first expanding the holes and pulling the fastener 480 into place in the holes, removing the expansion collet 411 and inserting a standard lockbolt collar thereover, and then swaging the standard collar into position on the engagement section 481.

As seen in FIG. 18, the collect 411 is inserted onto the drive pin 410 until it is carried by the support section 418 and the driving face 441 engages the abuttment surface 470. The leading end 412 of the drive pin 410 is then inserted into the holes H. The collar 484 is then slipped over the pulling section 415 on the offside of the work pieces P from the collet 411. The nose assembly N is then placed over the projecting end of the pulling section 415 so that the assembly is in position for operation as illustrated in FIG. 18.

Upon activation of the installation gun, the pulling section 415 is moved into the nose assembly N while the anvil AN forces the collar 484 toward the work pieces P. This causes the collet 411 to be forced through the holes H to expand same followed by the bearing section 485 being pulled into the holes H. When the collet 411 passes out of the holes H after expanding same, it passes through the passage 491 through the collar 484 and into the nose assembly N, as seen in FIG. 19. It will be noted that, as the collet 411 is pulled through the collar 484, it serves to center the collar 484 with respect to the drive pin 410 for swaging. After the collet 411 has passed through the collar 484 the nose assembly N continues to pull the drive pin 410 so that the bead 492 on the collar 484 is collapsed and the collar 484 swaged into position as seen in FIG. 20. The nose assembly N continues to pull the pulling section 425 until the pulling section 415 and support section 418 are broken from the lockbolt 480 at the breakneck groove 450 to complete the installation of the lockbolt 480, as illustrated in FIG. 20.

Figure 26:
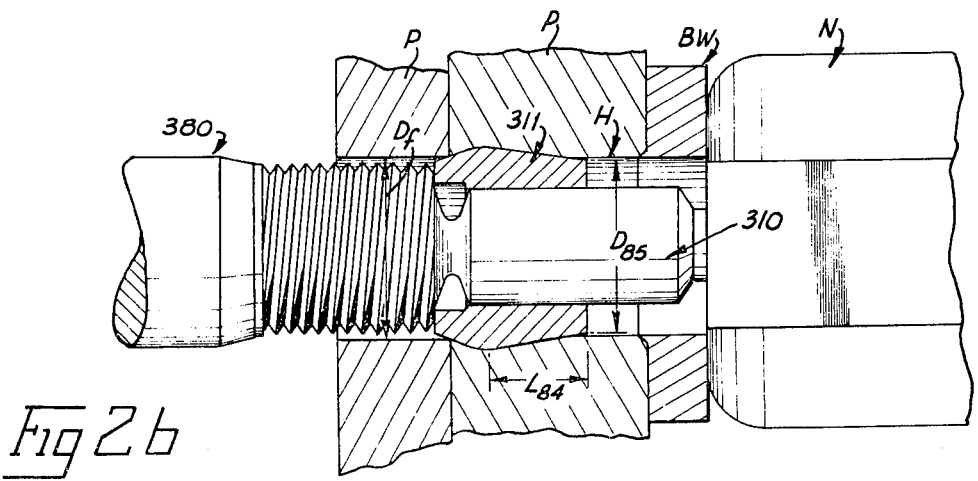
FIG. 26 is a view showing the final fastener installation after using the mandrel assembly of FIG. 24.

FIGS. 24–26 illustrate the use of the push-pull mandrel assembly with drive pin 610 and seamless expansion collet 611 to install a fastener where a large hole expansion is desired. As seen in FIG. 24, the expansion collet 611 is positioned onto the drive pin 610 so that the support section 618 supports the collet 611. The leading end of the drive pin 610 is inserted through the holes in the work pieces with one of the backup washers BW positioned therearound on the offside O of the work pieces P followed by the nose assembly N of the lockbolt installation gun. In this position, the leading end of the frusto-conical expansion surface 665 projects into the holes H through the work pieces. The driver 680 is then connected to a driving implement such as rivet gun RG in FIG. 35 and the pilot pin 684 positioned in the pilot hole 624 in the trailing end of pin 610 so that the working face 682 bears against the driven face 622 on the drive pin 610. Both the driving implement and the lockbolt installation gun LG in FIG. 35 are activated with the nose assembly N pulling the drive pin 610 toward the nose assembly N while the driver 680 simultaneously pushes the drive pin 610 toward the nose assembly N. This allows sufficient force to be generated to force the collet 611 through the holes H to expand them. It will also be noted that the outside diameter $D_{65}$ of the driving shoulder 640 as well as the diameter $D_{66}$ and $D_{80}$ of the driving extension 621 and the driving projection 681 are less than the preliminary diameter $D_p$ of the holes H after passage of the collet 611 therethrough. This insures clearance between the driving section 616 of the pin 610 and the driving projection 681 of the driver 680. It will also be noted that the length of the driving projection 681 is sufficient for this projection to extend through the holes H without interference therewith. Thus, it will be seen that the collet 611 expands the holes H to the preliminary diameter $D_p$ to prepare them for the subsequent fastener installation.

It is to be understood that either a threaded type fastener such as fastener 380 or a lockbolt type fastener such as the lockbolt 480 may be installed through the preliminarily expanded holes. For sake of simplicity, the threaded fastener 380 is illustrated in FIG. 26 as being installed in the hole. It will be seen that the drive pin 310 is used in conjunction with a final sizing collect 311' to finally expand the holes and install the fastener 380 therein. While the collet 311 may be used in lieu of the collet 311', the collet 311' has been foreshortened to length $L_{84}$ seen in FIG. 26 which serves to foreshorten the frusto-conical expansion subsurface 266 until its minimum leading diameter $D_{85}$ is slightly less than the preliminary expanded diameter $D_p$ of the holes H. Diameter $D_{85}$ is greater than the initial hole diameter $D_I$ to prevent the installation of the fastener 380 in the holes H prior to the preliminary enlarging operation. As the nose assembly N is activated, the collet 311' is pulled through the holes H to enlarge them to their maximum expansion and the bearing portion 385 of the fastener 380 pulled into the holes H as seen in FIG. 26. The installation of the fastener is completed as described hereinabove.

While specific embodiments of the invention have been disclosed herein, it is to be understood that full use may be made of modifications, substitutions and equivalents without departing from the inventive concept as disclosed herein.

I claim:

1. A preload adapter for use with a lockbolt installation gun having a nose assembly to install a fastener in holes through work pieces where the fastener has a threaded engagement section to be engaged by an internally threaded nut and a pulling section projecting beyond the threaded engagement section to be engaged by the nose assembly to exert an axial loading force on the fastener, said preload adapter comprising:

a body defining a bearing face thereon adapted to be engaged by the working end of the nose assembly and an opening therethrough slidably receiving the pulling section of the fastener therethrough for engagement by the nose assembly while bearing against said bearing face;

spacing means operatively connected to said body adapted to engage the work pieces about the holes, said spacing means adapted to space said body a prescribed distance from said work pieces so that sufficient clearance is provided to allow the nut on the threaded engagement section of the fastener to be tightened where the nose assembly is supported by said bearing face while the nose assembly engages the pulling section of the fastener to pull the fastener and work pieces together by exerting a force in a first direction on the work pieces through said spacing means while exerting a force in the opposite direction on the fastener to allow the nut to be screwed onto the threaded engagement section;

a wrench for selectively and drivingly engaging the nut to tighten the nut on the fastener while the nose assembly axially loads the fastener through said preload adapter; and, captivating means for preventing movement of said wrench toward and away from said bearing surface while allowing relative rotational movement between said wrench and said body to permit the nut to be tightened on the fastener by said wrench.

2. A preload adapter for use with a lockbolt installation gun having a nose assembly with a working face at its operating end to install a fastener in holes through work pieces where the fastener has a threaded engagement section to be engaged by an internally threaded nut and a pulling section projecting beyond the threaded engagement section to be engaged by the nose assembly to exert an axial loading force on the fastener, said preload adapter comprising:

a body having an adapter central axis, said body including an end bearing wall generally normal to said adapter central axis and defining a pulling section receiving passage therethrough concentric about said adapter central axis, said body further including an annular guide wall integral with one side of said end wall and projecting outwardly therefrom concentric about said adapter central axis so that said guide wall and said end wall define a guide chamber open at that end of said guide wall opposite said end wall, said guide chamber concentric about said adapter central axis and sized to slidably receive the operating end of the nose assembly therein so that the working face of the nose assembly bears against said end bearing wall and the nose assembly is maintained coaxial with said adapter central axis, said end bearing wall further defining a plurality of internally threaded holes therein circumferentially spaced about said end wall outboard of said pulling section receiving passage, said internally theaded holes oriented generally parallel to said adapter central axis and opening onto that side of said end bearing wall opposite said guide wall;

a plurality of shoulder bolts, each of said shoulder bolts having a bolt central axis, and including a head at one end, an externally threaded section sized to be threadedly received in said internally threaded holes in said end bearing wall at the other end so that said bolt central axis is generally parallel to said adapter central axis and a locating shoulder adjacent said externally threaded section adapted to engage said end bearing wall about said internally threaded holes to arrest the movement of said shoulder bolt toward said end bearing wall so that when said shoulder bolts are screwed into said internally threaded holes, said heads of said bolts can be placed against the work pieces to space said body from the work pieces sufficiently to clear the nut on the engagement section of the fastener with the pulling section on the fastener extending through said pulling section receiving passage in said end wall for engagement by the nose assembly to pull the fastener and work pieces together by exerting a force in a first direction on the work pieces through said shoulder bolts while exerting a force in the opposite direction on the fastener to allow the nut to be screwed onto the threaded engagement section, at least some of said shoulder bolts having different effective lengths so that the spacing between said end wall and the work pieces at any particular one of said shoulder bolts can be varied by interchanging said different length shoulder bolts; and, a nut driving wrench engageable with the nut on the fastener while the nose assembly is exerting the axial loading force on the fastener to tighten the nut onto the fastener.

3. The preload adapter of claim 2 wherein said nut driving wrench includes a driving element defining nut engaging surfaces thereon to drivingly engage the nut on the fastener, a handle rotatably mounted on said driving element, and ratchet means interconnecting said handle and said driving element to cause said handle to rotate said driving element in a first direction as said handle is moved; and wherein said body further includes captivating means connecting said driving element to said end wall so that said driving element is concentric about said adapted central axis and axially fixed relative to movement of said driving element along said adapter central axis but rotatable about said adapter central axis so that rotation of said driving element tightens the nut onto the fastener.

* * * * *